US011881158B2

(12) United States Patent
Ding et al.

(10) Patent No.: US 11,881,158 B2
(45) Date of Patent: Jan. 23, 2024

(54) DISPLAY PANEL AND DISPLAY DEVICE

(71) Applicant: Shanghai Tianma Microelectronics Co., Ltd., Shanghai (CN)

(72) Inventors: Hao Ding, Shanghai (CN); Jujian Fu, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 18/094,171

(22) Filed: Jan. 6, 2023

(65) Prior Publication Data

US 2023/0154392 A1 May 18, 2023

(30) Foreign Application Priority Data

Aug. 8, 2022 (CN) ......................... 202210943287.6

(51) Int. Cl.
*G09G 3/32* (2016.01)

(52) U.S. Cl.
CPC ......... *G09G 3/32* (2013.01); *G09G 2310/061* (2013.01); *G09G 2320/0247* (2013.01)

(58) Field of Classification Search
None
See application file for complete search history.

(56) References Cited

U.S. PATENT DOCUMENTS

2016/0124491 A1* 5/2016 An ........................ G06F 1/3265
713/323
2017/0061875 A1* 3/2017 Cho ..................... G09G 3/3233
2018/0174514 A1* 6/2018 Lee ....................... G09G 3/3233
2020/0388228 A1* 12/2020 Oh ......................... G09G 5/373
2021/0035514 A1* 2/2021 Cho ...................... G09G 3/3607
2021/0056895 A1* 2/2021 Lee ....................... G09G 3/3233
2021/0125557 A1* 4/2021 Na ........................ G09G 3/3233
2021/0312868 A1* 10/2021 Kim ...................... G09G 3/3266
2022/0051630 A1* 2/2022 Shen ..................... G09G 3/3291
2022/0076627 A1* 3/2022 Kim ...................... G09G 3/3233
2022/0101794 A1* 3/2022 Kim ...................... H10K 59/131
2022/0223093 A1* 7/2022 Tian ...................... G09G 3/3233
2022/0335898 A1* 10/2022 Hwang ................ G09G 3/3291
2023/0067920 A1* 3/2023 Kim ...................... G09G 3/3291
2023/0116559 A1* 4/2023 Park ...................... G09G 3/3233
345/204
2023/0129065 A1* 4/2023 Yoon .................... G09G 3/3225
345/204
2023/0169928 A1* 6/2023 Eun ....................... G09G 3/3233
345/204
2023/0215360 A1* 7/2023 Kim ...................... G09G 3/3233
345/691

* cited by examiner

*Primary Examiner* — Patrick N Edouard
*Assistant Examiner* — Peijie Shen
(74) *Attorney, Agent, or Firm* — KDW Firm PLLC

(57) ABSTRACT

Provided are a display panel and a display device. The display panel includes a light-emitting element and a pixel drive circuit electrically connected to the light-emitting element. The pixel drive circuit includes a drive transistor and a first reset module. The drive transistor is configured to control a drive current. The first reset module is connected to a first node and configured to provide a first reset voltage to the first node. The light-emitting element is connected to the first node. A working mode of the display panel comprise a first drive mode. A display frame in the first drive mode includes a valid frame and an invalid frame. In the first drive mode, a first reset voltage for the valid frame is different from a first reset voltage for the invalid frame.

19 Claims, 16 Drawing Sheets

| Voltage of VREF1 (V) | -2 | -2.2 | -2.4 | -2.6 | -2.8 | -3 | -3.2 | -3.4 |
|---|---|---|---|---|---|---|---|---|
| Variable-frequency brightness-level difference (%) | 10.83 | 9.48 | 7.87 | 5.93 | 3.41 | 0.68 | 2.02 | 4.54 |
| Brightness-level at 40Hz | 1.191768 | 1.17216 | 1.152771 | 1.13023 | 1.10147 | 1.06902 | 1.03886 | 1.01017 |
| Brightness-level at 120Hz | 1.062675 | 1.061036 | 1.06199 | 1.06316 | 1.06393 | 1.06173 | 1.06028 | 1.05824 |

| Voltage of VREF1 (V) | -2 | -2.2 | -2.4 | -2.6 | -2.8 | -3 | -3.2 | -3.4 |
|---|---|---|---|---|---|---|---|---|
| Variable-frequency brightness-level difference (%) | 0.67 | 0.63 | 0.61 | 0.55 | 0.52 | 0.5 | 0.46 | 0.37 |
| Brightness-level at 40Hz | 484.4451 | 484.2358 | 484.2144 | 484.328 | 484.3267 | 484.2929 | 484.3982 | 484.5088 |
| Brightness-level at 120Hz | 487.6992 | 487.3082 | 487.1966 | 487.01 | 486.8387 | 486.7211 | 486.6414 | 486.3073 |

DISPLAY PANEL AND DISPLAY DEVICE

CROSS-REFERENCE TO RELATED APPLICATION(S)

This application claims priority to Chinese Patent Application No. 202210943287.6 filed Aug. 8, 2022, the disclosure of which is incorporated herein by reference in its entirety.

TECHNICAL FIELD

The present disclosure relates to the field of display technologies and, in particular, to a display panel and a display device.

BACKGROUND

A display panel uses different refresh rates for display in different application scenarios, such as using a drive mode having a higher refresh rate to drive for displaying dynamic images (such as sports events or game scenarios), to ensure the smoothness of the dynamic images displayed; and using a drive mode having a lower refresh rate to drive for displaying slow-motion images or static images, to reduce the power consumption. Different refresh rates are switched, such as a higher refresh rate switched to a lower refresh rate, or a lower refresh rate switched to a higher refresh rate, to satisfy different display requirements.

However, a difference in display brightness-level exists among different refresh rates, causing a display brightness-level difference being perceptible to human eyes when different refresh rates are switched, affecting the normal display of the display device.

SUMMARY

The present disclosure provides a display panel and a display device to alleviate the difference between the display brightness-level of the display panel at a lower refresh rate and the display brightness-level of the display panel at a higher refresh rate, and to improve the display effect of the display panel.

Embodiments of the present disclosure provide a display panel. The display panel includes a light-emitting element and a pixel drive circuit electrically connected to the light-emitting element.

The pixel drive circuit includes a drive transistor and a first reset module. The drive transistor is configured to control a drive current. The first reset module is connected to a first node and configured to provide a first reset voltage to the first node. The light-emitting element is connected to the first node.

A working mode of the display panel includes a first drive mode. A display frame in the first drive mode includes a valid frame and an invalid frame. In the first drive mode, a first reset voltage for the valid frame is different from a first reset voltage for the invalid frame.

Embodiments of the present disclosure provides a display device. The display device includes the preceding display panel.

DETAILED DESCRIPTION

Figure 1:
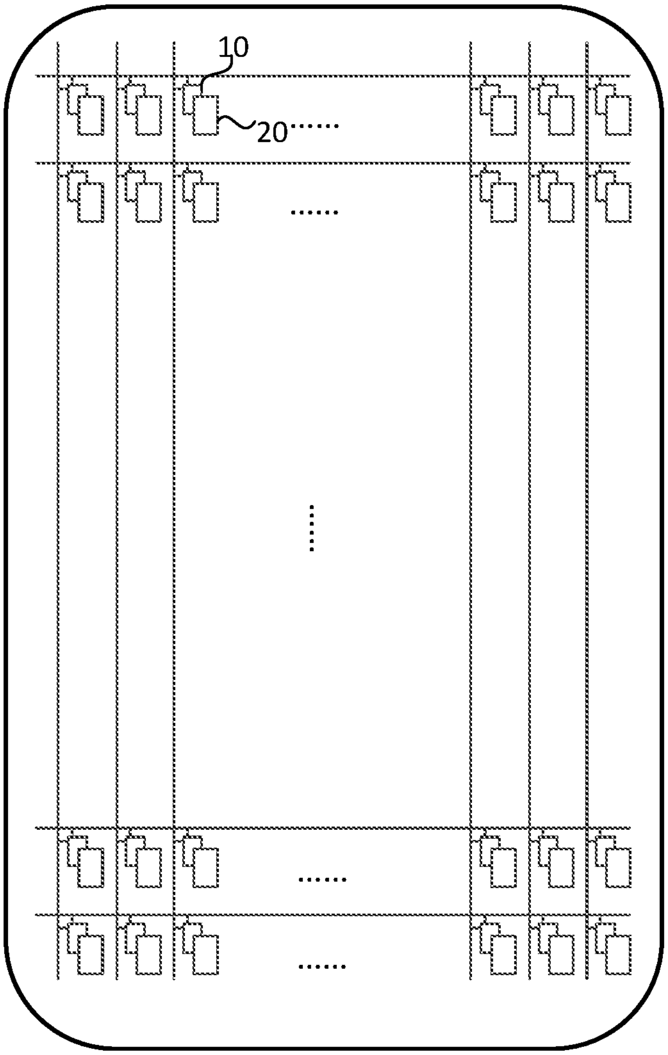
FIG. 1 is a schematic diagram of a display panel according to an embodiment of the present disclosure.

Hereinafter the present disclosure will be further described in detail in conjunction with the drawings and embodiments. It is to be understood that the specific embodiments set forth below are intended to illustrate and not to limit the present disclosure. Additionally, it is to be noted that for ease of description, only part, not all, of the structures related to the present disclosure are illustrated in the drawings.

When a display panel displays images, a leakage current exists in a transistor of a pixel drive circuit. As time passing by, the brightness-level of the light-emitting diode driven by the pixel drive circuit varies increasingly, causing a difference between the display brightness-level of the display panel at a lower refresh rate and the display brightness-level of the display panel at a higher refresh rate. When the display panel switches between the lower refresh rate and the higher refresh rate, a user can perceive the difference in the display brightness-level of the display panel so that the visual effect of the display is adversely affected.

Figure 2:
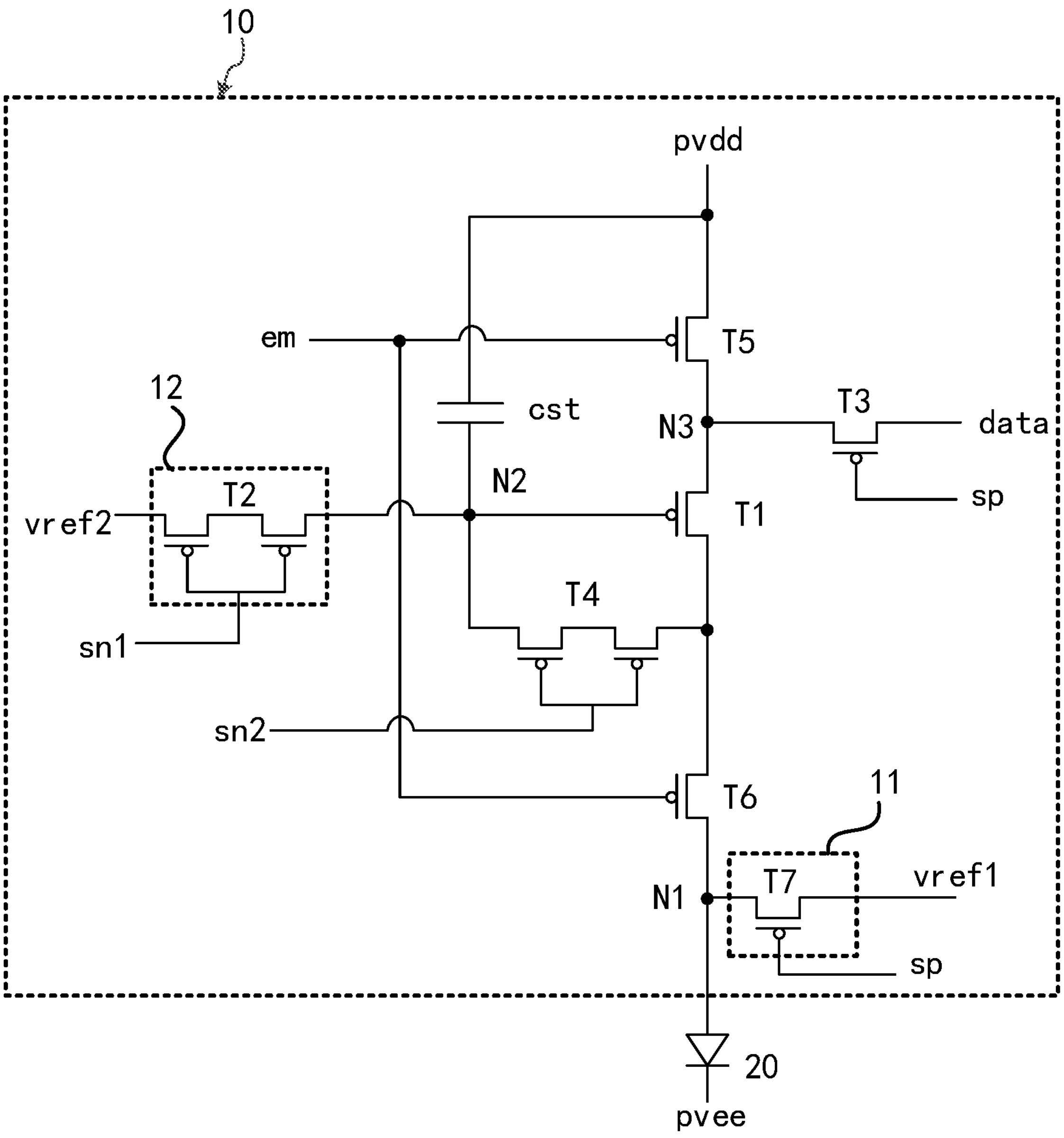
FIG. 2 is a schematic circuit diagram of a pixel drive circuit according to an embodiment of the present disclosure.
Figures 3, 4:
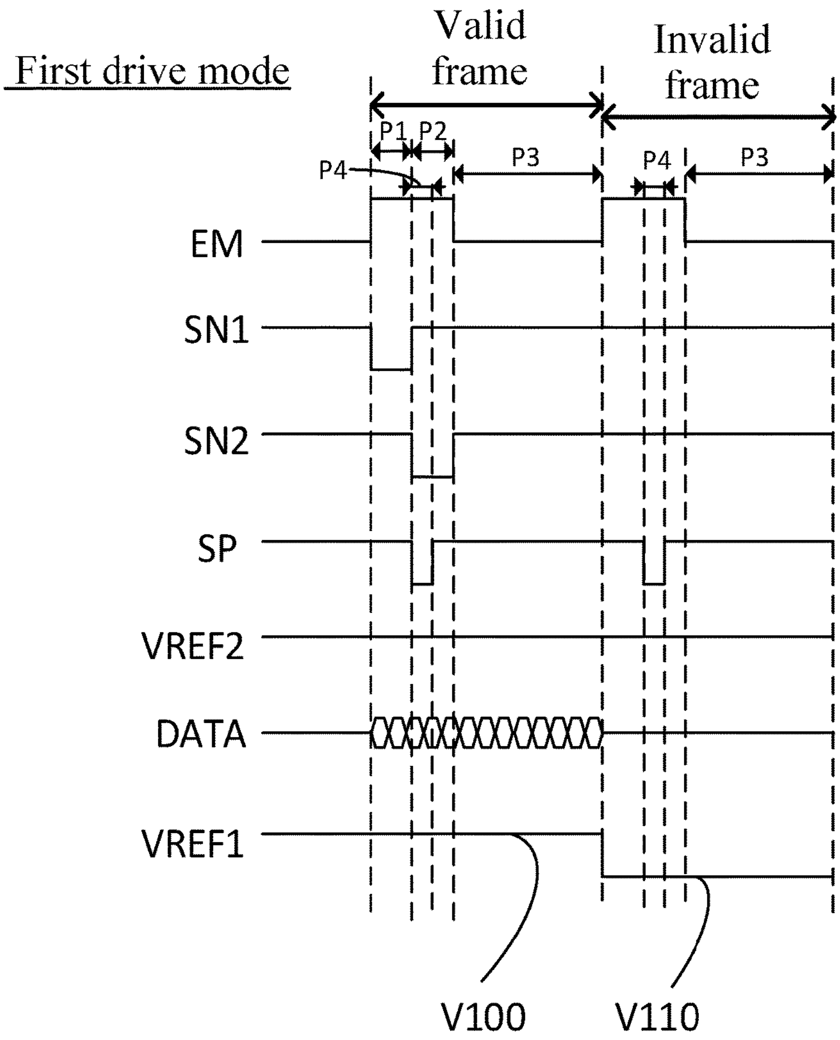
FIG. 3 is a schematic timing diagram of a pixel drive circuit according to an embodiment of the present disclosure.
FIG. 4 is a table of data about variable-frequency brightness-level at a grayscale level of 16.

FIG. 1 is a schematic diagram of a display panel according to an embodiment of the present disclosure. FIG. 2 is a schematic circuit diagram of a pixel drive circuit according to an embodiment of the present disclosure. FIG. 3 is a schematic timing diagram of a pixel drive circuit according to an embodiment of the present disclosure. Referring to FIGS. 1, 2 and 3, the display panel includes light-emitting elements 20 and pixel drive circuits 10 electrically connected to the light-emitting elements 20. A pixel drive circuit 10 of the pixel drive circuits 10 includes a drive transistor T1 and a first reset module 11. The drive transistor T1 is configured to control a drive current for controlling the light-emitting brightness-level of the light-emitting element 20. The first reset module 11 is connected to a first node N1 and configured to provide a first reset voltage VREF1 to the first node N1, to reset the first node N1. The light-emitting element 20 is connected to the first node N1. That is, the first reset module 11 is electrically connected to the light-emitting element 20. The first node N1 may be a physical connection point or a virtual connection point. A working mode of the display panel includes a first drive mode. A display frame in the first drive mode includes a valid frame and an invalid frame. In the first drive mode, a first reset voltage VREF1 for the valid frame is different from a first reset voltage VREF1 for the invalid frame. In an example, referring to FIGS. 2 and 3, a control terminal of the first reset module 11 is electrically connected to a strobe scan signal control terminal sp, a first terminal of the first reset module 11 is connected to the first node N1, and a second terminal of the first reset module 11 is electrically connected to a first reset voltage terminal vref1. When a strobe scan signal SP transmitted by the strobe scan signal control terminal sp controls the first reset module 11 to be conductive, a first reset voltage VREF1 for the first reset voltage terminal vref1 is transmitted to the first node N1.

In the related art, a leakage current of a transistor has different performance in a period in which the pixel drive circuit drives the light-emitting element based on a data signal at a high grayscale level and a period in which the pixel drive circuit drives the light-emitting element based on a data signal at a low grayscale level. Therefore, the difference between the display brightness-level of the pixel drive circuit based on the data signal at the low grayscale level at the lower refresh rate and the display brightness-level of the pixel drive circuit based on the data signal at the low grayscale level at the higher refresh rate is different from the difference between the display brightness-level of the pixel drive circuit based on the data signal at the high grayscale level at the lower refresh rate and the display brightness-level of the pixel drive circuit based on the data signal at the high grayscale level at the higher refresh rate. The difference between the display brightness-level of the pixel drive circuit based on the data signal at the low grayscale level at the lower refresh rate and the display brightness-level of the pixel drive circuit based on the data signal at the low grayscale level at the higher refresh rate is greater, causing a problem of frequency variation flicker.

It is to be noted that the grayscale level is divided based on the brightness-level of the light-emitting element. The greater the grayscale level, the higher the brightness-level. The low grayscale level and the high grayscale level in the present disclosure are relative to each other. For example, the brightness-level of the light-emitting element represented by the low grayscale level is lower than that of the light-emitting element represented by the high grayscale level. The low grayscale level and the high grayscale level in the present disclosure can be understood as absolute concepts. For example, 256 grayscale levels are taken as an example, a grayscale level greater than a grayscale level of 127 is considered as the high grayscale level, and a grayscale level lower than or equal to the grayscale level of 127 is considered as the low grayscale level; or a grayscale level greater than a grayscale level of 63 is considered as the high grayscale level, and a grayscale level lower than or equal to the grayscale level of 63 is considered as the low grayscale level.

In the display panel, all pixel drive circuits in a same row or in a same column generally receive a same type of signals provided by a same signal line. For example, all pixel drive circuits in a column are connected to the same data signal line to receive a data signal, or all pixel drive circuits in a same row are connected to the same scan signal line to receive a specific scan signal. For all the pixel drive circuits in a same column or in the same row, it may exist that part of pixel drive circuits in the same row or in the same column receives the data signal at the low grayscale level, while other pixel drive circuits in the same row or in the same column receives the data signal at the high grayscale level. Thus, it is difficult to independently and in real time provide a corresponding brightness-level adjustment scheme to a single pixel drive circuit based on whether the received data signal is at the high grayscale level or at the low grayscale level.

In the embodiments of the present disclosure, as the first reset voltage VREF1 has different effects on the brightness-level adjustment at the low grayscale level and the brightness-level adjustment at the high grayscale level, the first reset voltage VREF1 is adjusted to adjust the brightness-level at the low grayscale level, under a condition that the brightness-level performance at the high grayscale level is not affected.

Figures 5, 6:
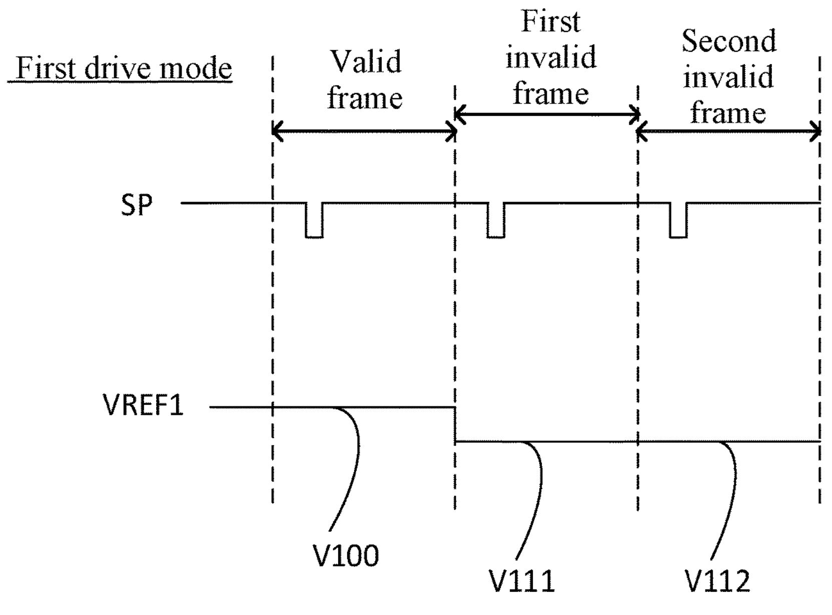
FIG. 5 is a table of data about variable-frequency brightness-level at a grayscale level of 255.
FIG. 6 is another schematic timing diagram of a pixel drive circuit according to an embodiment of the present disclosure.

FIGS. 4 and 5 are experimental data obtained according to the embodiments of the present disclosure. FIG. 4 is a table of data about variable-frequency brightness-level at a grayscale level of 16. FIG. 5 is a table of data about variable-frequency brightness-level at a grayscale level of 255. The brightness-level of 500 nits is taken as an example. FIGS. 4 and 5 show data obtained on the condition of an experimental parameter as 500 nits. A correspondence between the brightness-level and the grayscale level is: nits of 0~500 correspond to grayscale levels of 0~255. The grayscale level of 16 in FIG. 4 is the grayscale level of 16 in the grayscale levels of 0~255. The grayscale level of 255 in FIG. 5 is the grayscale level of 255 in the grayscale levels of 0~255. The grayscale level of 16 is taken as an example for the low grayscale level. The grayscale level of 255 is taken as an example for the high grayscale level.

Referring to FIG. 4, at the grayscale level of 16, at the first reset voltage VREF1, a variable-frequency brightness-level difference caused by the brightness-level difference at a frequency of 40 Hz and at a frequency of 120 Hz is relatively large. The variable-frequency brightness-level difference is 10.83% when VREF1=−2V. The variable-frequency brightness-level difference is 9.48% when VREF1=−2.2V. The variable-frequency brightness-level difference is 7.87% when VREF1=−2.4V. The variable-frequency brightness-level difference is 5.93% when VREF1=−2.6V The variable-frequency brightness-level difference is 3.41% when VREF1=−2.8V The variable-frequency brightness-level difference is 0.68% when VREF1=−3V. The variable-frequency brightness-level difference is 2.02% when VREF1=−3.2V. The variable-frequency brightness-level difference is 4.54% when VREF1=−3.4V. The variable-frequency brightness-level difference is significantly affected by the fluctuation of the first reset voltage VREF1 and can bring a substantial variation to the brightness-level at the low grayscale level. For example, a variable-frequency brightness-level difference corresponding to a flicker that is perceptible to human eyes is adjusted to a variable-frequency brightness-level difference that is not perceptible to the human eyes, i.e., to a compliant variable-frequency brightness-level difference.

Referring to FIG. 5, at the grayscale level of 255, in each first reset voltage VREF1, a variable-frequency brightness-level difference caused by the brightness-level difference at a frequency of 40 Hz and at a frequency of 120 Hz is relatively small. The variable-frequency brightness-level difference is 0.67% when VREF1=−2V. The variable-frequency brightness-level difference is 0.63% when VREF1=−2.2V. The variable-frequency brightness-level difference is 0.61% when VREF1=−2.4V. The variable-frequency brightness-level difference is 0.55% when VREF1=−2.6V The variable-frequency brightness-level difference is 0.52% when VREF1=−2.8V The variable-frequency brightness-level difference is 0.5% when VREF1=−3V. The variable-frequency brightness-level difference is 0.46% when VREF1=−3.2V. The variable-frequency brightness-level difference is 0.37% when VREF1=−3.4V. The variable-frequency brightness-level difference is less affected by the fluctuation of the first reset voltage VREF1. The variable-frequency brightness-level difference at each first reset voltage VREF1 is lower than 2%, and the difference in the display brightness-level is not perceptible to the human eyes when different refresh rates are switched. With respect to the experimental data of FIG. 4, on the same experimental condition, the first reset voltage VREF1 has a relatively small ability to adjust the variable-frequency brightness-level difference at the high grayscale level.

From the experimental data of FIGS. 4 and 5, it can be found that the adjustment of the first reset voltage affects both the brightness-level at the low grayscale level and the brightness-level at the high grayscale level. A fundamental brightness-level value at the high grayscale level is relatively large so that the brightness-level fluctuation brought by the variation of the first reset voltage VREF1 can be negligible with respect to the fundamental brightness-level value at the high grayscale level. A fundamental brightness-level value at the low grayscale level is relatively small so that the brightness-level fluctuation brought by the variation of the first reset voltage VREF1 cannot be negligible with respect to the fundamental brightness-level value at the low grayscale level.

The embodiments of the present disclosure provide a display panel. In the first drive mode, the first reset voltage VREF1 for the valid frame is different from the first reset voltage VREF1 for the invalid frame. That is, the first reset voltage VREF1 received at the valid frame is different from the first reset voltage VREF1 received at the invalid frame by the light-emitting element 20. The first reset voltage VREF1 for the invalid frame is adjusted to be a voltage different from the first reset voltage VREF1 for the valid frame, and the charging speed for charging the light-emitting element 20 is adjusted, reducing the difference between the display brightness-level of the invalid frame and the display brightness-level of the valid frame at the low grayscale level, reducing the difference between the display brightness-level at the lower refresh rate and at the low grayscale level and the display brightness-level at the higher refresh rate and at the low grayscale level, alleviating the flicker problem at the low grayscale level when the frequency is switched, reducing the difference between the display brightness-level of the display panel at the lower refresh rate and the display brightness-level of the display panel at the higher refresh rate, and improving the display effect of the display panel.

In the embodiments of the present disclosure, the data signal is written to a gate of the drive transistor for the valid frame, and is not written to the gate of the drive transistor for the invalid frame.

In an example, referring to FIG. 3, one display frame may be the valid frame or the invalid frame. The valid frame is the display frame with the data signal being written. The invalid frame is the display frame without the data signal being written. The invalid frame drives the light-emitting element 20 to emit light by using the data signal written at the valid frame.

The display panel has a higher drive frequency at the higher refresh rate and a lower drive frequency at the lower refresh rate. The frequency of the valid frame at the higher refresh rate is higher than the frequency of the valid frame at the lower refresh rate of the display panel. One implementation is to reduce the frequency to an integer multiple of a fundamental frequency on the basis of the fundamental frequency. The display frame of the fundamental frequency includes the valid frame. The display frame after the frequency is reduced on the basis of the fundamental frequency includes the valid frame and the invalid frame. The frame duration of the valid frame and the frame duration of the invalid frame may be the same. In other words, the invalid frame is inserted between adjacent valid frames to reduce the drive frequency. The number of invalid frames inserted between the adjacent valid frames is varied to vary the reduction multiple of the drive frequency. For example, the fundamental frequency is 120 Hz, and the reduced frequency may be 60 Hz, 40 Hz, or 30 Hz. In each embodiment of the present disclosure, the switching between two drive frequencies may be the switching between the fundamental frequency and a frequency downconverted from the fundamental frequency or the switching between two frequencies downconverted from the same fundamental frequency. Another implementation is to vary the frame driving duration of the display frame of the fundamental frequency to achieve different fundamental frequencies. For example, a first fundamental frequency is 120 Hz and a second fundamental frequency is 90 Hz. A frequency downconverted from the first fundamental frequency may be 60 Hz, 40 Hz, or 30 Hz. A frequency downconverted from the second fundamental frequency may be 45 Hz, or 30 Hz. In each embodiment of the present disclosure, the switching between two frequencies may also be the switching between two fundamental frequencies or two frequencies downconverted from two different fundamental frequencies.

Referring to FIG. 3, the first reset voltage VREF1 for the invalid frame is lower than the first reset voltage VREF1 for the valid frame. In the embodiments of the present disclosure, the voltage value of the first reset voltage VREF1 at the invalid frame is pulled down, the voltage value of the anode of the light-emitting element 20 (the anode of the light-emitting element 20 is connected to the first node N1, and the cathode of the light-emitting element 20 is connected to the second power terminal pvee) is reduced, the brightness-level value of the light-emitting element 20 is pulled down when the invalid frame receives the first reset voltage VREF1, suppressing the brightness-level elevation of the light-emitting element 20 at the invalid frame, making the dark state brightness-level after the frequency is switched be lowered and the display brightness-level at the lower refresh rate and at the low grayscale level be pulled down, and reducing the difference between the display brightness-level at the higher refresh rate and at the low grayscale level and the display brightness-level at the lower refresh rate and at the low grayscale level. The dark state brightness-level is the display brightness-level of the display panel at the low grayscale level.

Referring to FIG. 3, the first reset voltage VREF1 for the valid frame includes a first voltage V100. The first reset voltage for the invalid frame includes a second voltage V110. The difference between the second voltage V110 and the first voltage V100 is ranged from 0.1V to 1V That is, $0.1V \leq (V110-V100) \leq 1V$.

Further, the difference between the second voltage V110 and the first voltage V100 may be reduced. The difference between the second voltage V110 and the first voltage V100 does not exceed 0.2V, to limit the pulldown extent of the display brightness-level at the lower refresh rate and at the low grayscale level, and prevent the display brightness-level at the lower refresh rate and at the low grayscale level from being excessively pulled down.

FIG. 6 is another schematic timing diagram of a pixel drive circuit according to an embodiment of the present disclosure. Referring to FIG. 6, the display frame in the first drive mode includes at least two invalid frames. The first reset voltage VREF1 for each of the at least two invalid frames are the same. Two invalid frames having the same first reset voltages VREF1 are provided with the same voltage, reducing the design requirements of the drive circuit in the display panel.

In an example, referring to FIG. 6, the at least two invalid frames include a first invalid frame and a second invalid frame. In a drive sequence, the first invalid frame is located between the valid frame and the second invalid frame. A first reset voltage VREF1 for the first invalid frame is denoted as V111. A first reset voltage VREF1 for the second invalid frame is denoted as V112. V111=V112. V111<V100, and V112<V100.

In some embodiments, in the first drive mode, the first reset voltage VREF1 for each invalid frame between two adjacent valid frames is the same, reducing the design requirements of the drive circuit in the display panel.

Figure 7:
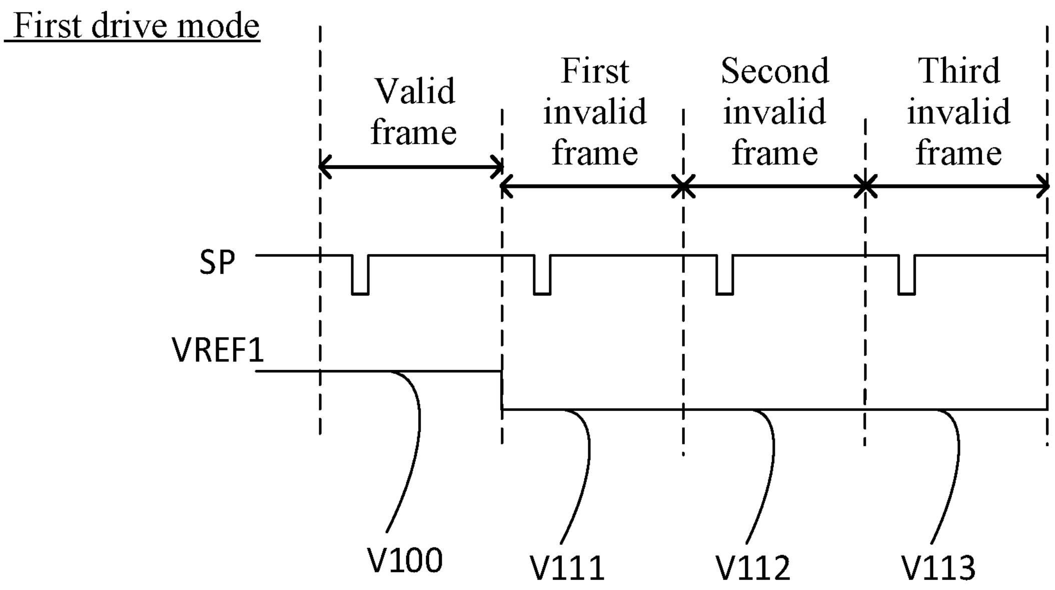
FIG. 7 is another schematic timing diagram of a pixel drive circuit according to an embodiment of the present disclosure.

FIG. 7 is another schematic timing diagram of a pixel drive circuit according to an embodiment of the present disclosure. Referring to FIG. 7, at least two invalid frames include a first invalid frame, a second invalid frame and a third invalid frame. In a drive sequence, the first invalid frame is located between the valid frame and the second invalid frame, and the second invalid frame is located between the first invalid frame and the third invalid frame. A first reset voltage VREF1 for the first invalid frame is denoted as V111. A first reset voltage VREF1 for the second invalid frame is denoted as V112. A first reset voltage VREF1 for the third invalid frame is denoted as V113. V111=V112=V113. V111<V100, V112<V100, and V113<V100.

Figure 8:
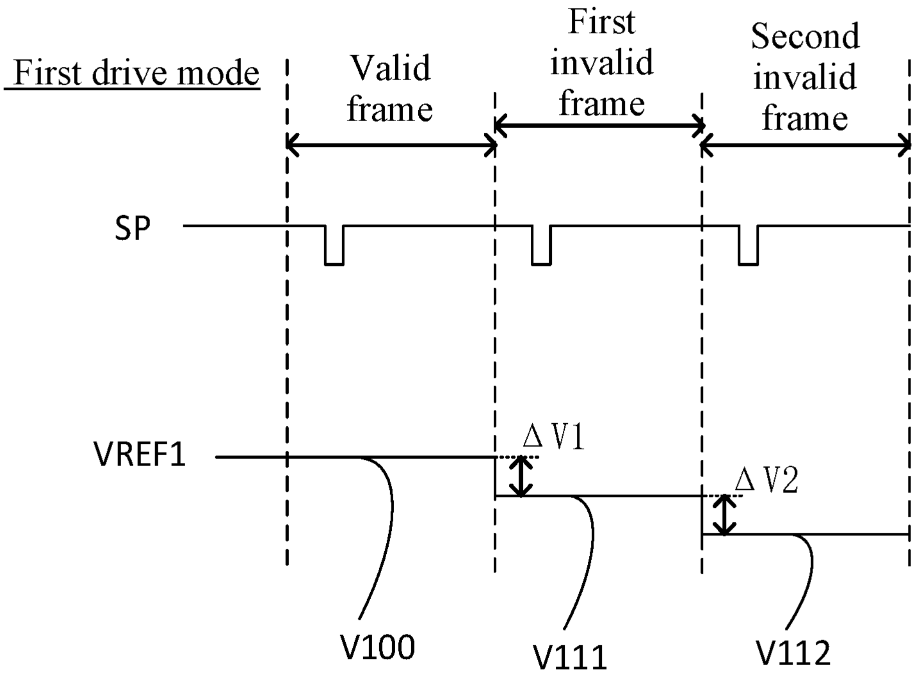
FIG. 8 is another schematic timing diagram of a pixel drive circuit according to an embodiment of the present disclosure.

FIG. 8 is another schematic timing diagram of a pixel drive circuit according to an embodiment of the present disclosure. Referring to FIG. 8, the display frame in the first drive mode includes at least two invalid frames. The at least two invalid frames have different first reset voltages VREF1.

In an example, referring to FIG. 8, at least two invalid frames include a first invalid frame and a second invalid frame. In a drive sequence, the first invalid frame is located between the valid frame and the second invalid frame. A first reset voltage VREF1 for the first invalid frame is denoted as V111. A first reset voltage VREF1 for the second invalid frame is denoted as V112. V111 is not equal to V112.

In some embodiments, referring to FIG. 8, the first reset voltage VREF1 for the first invalid frame is denoted as V111. The first reset voltage VREF1 for the valid frame includes a first voltage V100. The first reset voltage VREF1 for the second invalid frame is denoted as V112. V111<V100, and V112<V111. At the invalid frame, the light-emitting element 20 is driven to emit light by a data signal written at the valid frame. The data signal is not written at the invalid frame. The first invalid frame is the first display frame after the valid frame. The second invalid frame is the second display frame after the valid frame. The time duration of the second invalid frame from the valid frame is longer than the time duration of the first invalid frame from the valid frame. As time passed by, the leakage degree of the second invalid frame is heavier than the leakage degree of the first invalid frame. Therefore, it is needed to pull down the first reset voltage VREF1 for the second invalid frame and set the first reset voltage VREF1 for the second invalid frame to be lower than the first reset voltage VREF1 for the first invalid frame.

In some embodiments, referring to FIG. 8, the difference between the first reset voltage VREF1 for the first invalid frame and the first reset voltage VREF1 for the valid frame is a first difference ΔV1. The difference between the first reset voltage VREF1 for the second invalid frame and the first reset voltage VREF1 for the first invalid frame is a second difference ΔV2. The first difference ΔV1 is equal to the second difference ΔV2. The voltage drop from the first reset voltage VREF1 for the valid frame to the first reset voltage VREF1 for the first invalid frame is the same as the voltage drop from the first reset voltage VREF1 for the first invalid frame to the first reset voltage VREF1 for the second invalid frame, reducing the design requirements of the drive circuit in the display panel.

In other embodiments, as time passed by and the leakage continues, the leakage current of the transistor becomes smaller and smaller. The voltage drop from the first reset voltage VREF1 for the valid frame to the first reset voltage VREF1 for the first invalid frame is relatively large. The voltage drop from the first reset voltage VREF1 for the first invalid frame to the first reset voltage VREF1 for the second invalid frame is relatively small. The first difference ΔV1 is greater than the second difference ΔV2.

Figure 9:
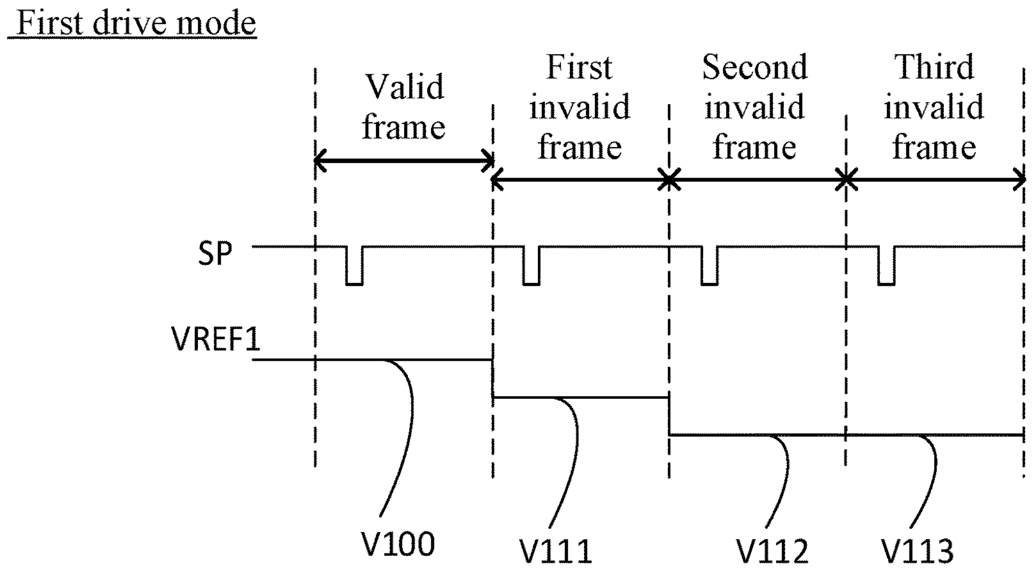
FIG. 9 is another schematic timing diagram of a pixel drive circuit according to an embodiment of the present disclosure.

FIG. 9 is another schematic timing diagram of a pixel drive circuit according to an embodiment of the present disclosure. Referring to FIG. 9, the display frame in the first drive mode includes at least three invalid frames. First reset voltages VREF1 of at least two invalid frames of the at least three invalid frames are the same. The first reset voltages VREF1 of at least two invalid frames of the at least three invalid frames are different. That is to say, in the invalid frames between the two adjacent valid frames, part of the invalid frames have the same first reset voltage VREF1 and other part of the invalid frames have different first reset voltages VREF1.

In an example, referring to FIG. 9, the at least three invalid frames include a first invalid frame, a second invalid frame and a third invalid frame. In a drive sequence, the first invalid frame is located between the invalid frame and the second invalid frame, and the second invalid frame is located between the first invalid frame and the third invalid frame. A first reset voltage VREF1 for the first invalid frame is denoted as V111. A first reset voltage VREF1 for the second invalid frame is denoted as V112. A first reset voltage VREF1 for the third invalid frame is denoted as V113. V112<V111, and V112=V113.

Figure 10:
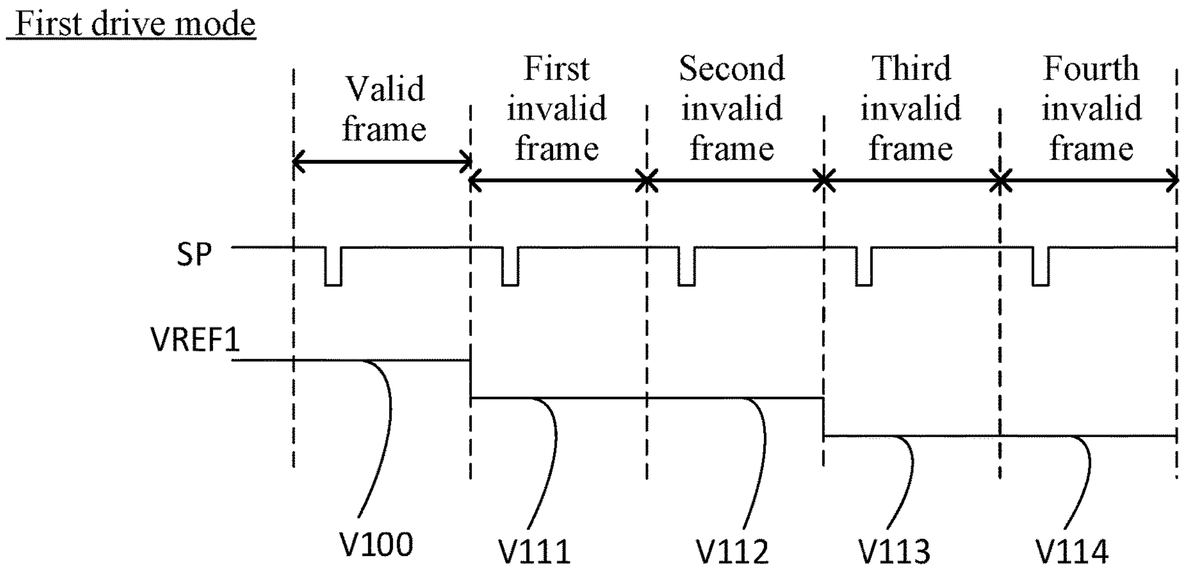
FIG. 10 is another schematic timing diagram of a pixel drive circuit according to an embodiment of the present disclosure.

FIG. 10 is another schematic timing diagram of a pixel drive circuit according to an embodiment of the present disclosure. Referring to FIG. 10, the display frame in the first drive mode includes at least four invalid frames. At least two adjacent invalid frames form an invalid frame unit. First reset voltages VREF1 for invalid frames within the same invalid frame unit are the same. First reset voltages VREF1 for invalid frames within different invalid frame units are different.

In an example, referring to FIG. 10, the at least four invalid frames include a first invalid frame, a second invalid frame, a third invalid frame and a fourth invalid frame. In a drive sequence, the first invalid frame is located between the invalid frame and the second invalid frame, the second invalid frame is located between the first invalid frame and the third invalid frame, and the third invalid frame is located between the second invalid frame and the fourth invalid frame. A first reset voltage VREF1 for the first invalid frame is denoted as V111. A first reset voltage VREF1 for the second invalid frame is denoted as V112. A first reset voltage VREF1 for the third invalid frame is denoted as V113. A first reset voltage VREF1 for the fourth invalid frame is denoted as V114. V111=V112, V113=V114, and V113<V112. V111<V100, V112<V100, V113<V100, and V114<V100.

In some embodiments, first reset voltages VREF1 for any two invalid frames between two adjacent valid frames are different.

Figure 11:
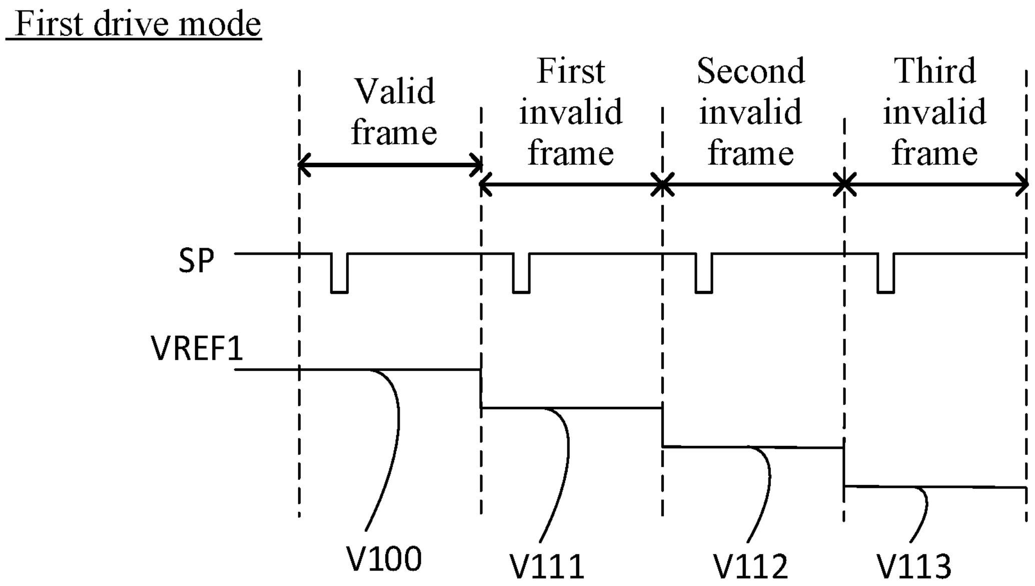
FIG. 11 is another schematic timing diagram of a pixel drive circuit according to an embodiment of the present disclosure.

FIG. 11 is another schematic timing diagram of a pixel drive circuit according to an embodiment of the present disclosure. Referring to FIG. 11, a first reset voltage VREF1 for the first invalid frame is denoted as V111. A first reset voltage VREF1 for the second invalid frame is denoted as V112. A first reset voltage VREF1 for the third invalid frame is denoted as V113. Any two of V111, V112 and V113 are different.

In an example, referring to FIG. 11, the first invalid frame is the first display frame after the valid frame. The second invalid frame is the second display frame after the valid frame. The third invalid frame is the third display frame after the valid frame. The time duration of the second invalid frame is longer than the time duration of the first invalid frame from the valid frame. The time duration of the third invalid frame from the valid frame is heavier than the time duration of the second invalid frame from the valid frame. The leakage degree of the third invalid frame is heavier than the leakage degree of the second invalid frame. The leakage degree of the second invalid frame is heavier than the leakage degree of the first invalid frame. Therefore, the first reset voltage VREF1 for the second invalid frame is set to be lower than the first reset voltage VREF1 for the first invalid frame, and the first reset voltage VREF1 for the third invalid frame is set to be lower than the first reset voltage VREF1 for the second invalid frame.

In some embodiments, the first reset voltage VREF1 for the invalid frame that is away from the valid frame may also be higher than the first reset voltage VREF1 for the invalid frame that is closer to the valid frame. The invalid frames that are compared with each other in the embodiments of the present disclosure are located between the two adjacent valid frames.

Figure 12:
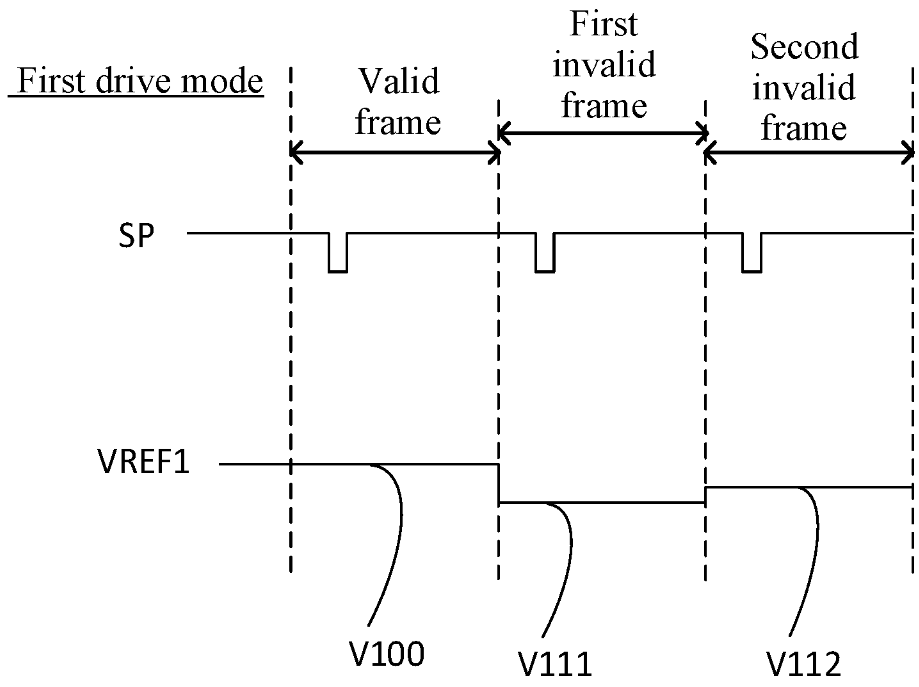
FIG. 12 is another schematic timing diagram of a pixel drive circuit according to an embodiment of the present disclosure.

FIG. 12 is another schematic timing diagram of a pixel drive circuit according to an embodiment of the present disclosure. Referring to FIG. 12, a first reset voltage VREF1 for a first invalid frame is denoted as V111. A first reset voltage VREF1 for a second invalid frame is denoted as V112. V111<V112.

Figure 13:
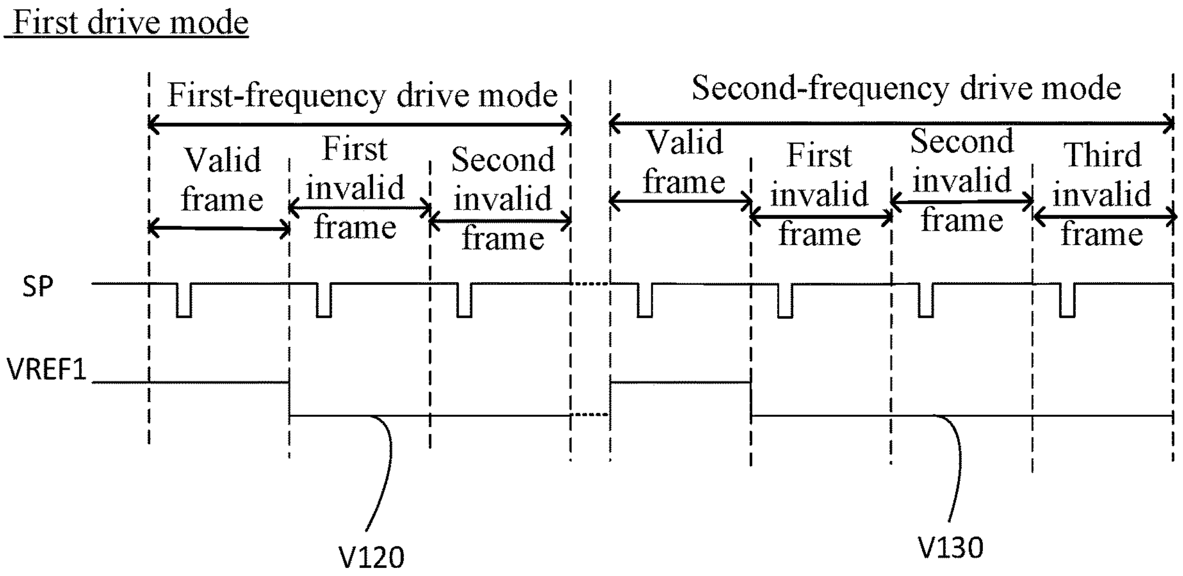
FIG. 13 is another schematic timing diagram of a pixel drive circuit according to an embodiment of the present disclosure.

FIG. 13 is another schematic timing diagram of a pixel drive circuit according to an embodiment of the present disclosure. Referring to FIG. 13, the first drive mode includes a first-frequency drive mode and a second-frequency drive mode. The frequency of the valid frame in the first-frequency drive mode is higher than the frequency of the valid frame in the second-frequency drive mode. In the first-frequency drive mode, the number of invalid frames inserted between two adjacent valid frames is relatively small. In the second-frequency drive mode, the number of invalid frames inserted between two adjacent valid frames is relatively large. A first reset voltage VREF1 for the invalid frame in the first-frequency drive mode is denoted as V120. A first reset voltage VREF1 for the invalid frame in the second-frequency drive mode is denoted as V130. V120 is the same as V130. The first reset voltage VREF1 for the invalid frame in the first-frequency drive mode is the same as the first reset voltage VREF1 for the invalid frame in the second-frequency drive mode, reducing the design requirements of the drive circuit in the display panel.

In an example, referring to FIG. 13, the first-frequency drive mode and the second-frequency drive mode have the same fundamental frequency. The first-frequency drive mode and the second-frequency drive mode are frequencies reducing from the same fundamental frequency. The fundamental frequency of 120 Hz is taken as an example. The first-frequency drive mode includes a valid frame, a first invalid frame, and a second invalid frame. Two invalid frames are inserted between two adjacent valid frames. The frequency is reduced to one third of the fundamental frequency. The drive frequency in the first-frequency drive mode is 40 Hz. The second-frequency drive mode includes a valid frame, a first invalid frame, a second invalid frame and a third invalid frame. Three invalid frames are inserted between two adjacent valid frames. The frequency is reduced to one quarter of the fundamental frequency. The drive frequency in the second-frequency drive mode is 30 Hz.

In an example, referring to FIG. 13, a first reset voltage VREF1 for the first invalid frame in the first-frequency drive mode is the same as a first reset voltage VREF1 for the second invalid frame in the first-frequency drive mode. a first reset voltage VREF1 for the first invalid frame in the second-frequency drive mode, a first reset voltage VREF1 for the second invalid frame in the second-frequency drive mode, and a first reset voltage VREF1 for the third invalid frame in the second-frequency drive mode are all the same. The first reset voltage VREF1 for the first invalid frame in the first-frequency drive mode and the first reset voltage VREF1 for the first invalid frame in the second-frequency drive mode are the same.

In other embodiments, the first-frequency drive mode and the second-frequency drive mode may have different fundamental frequencies.

Figure 14:
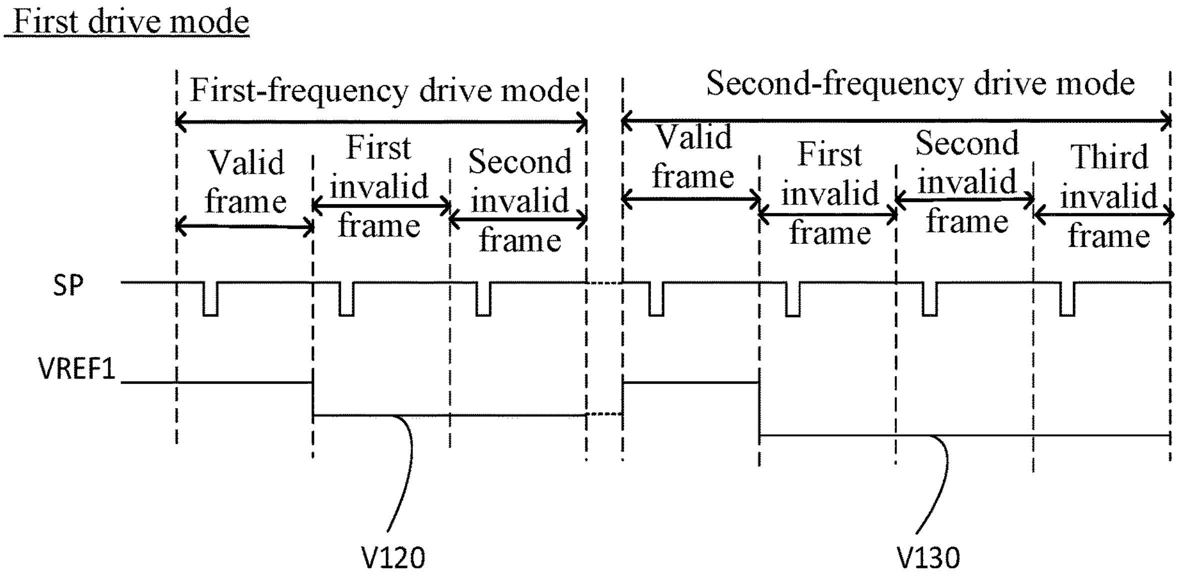
FIG. 14 is another schematic timing diagram of a pixel drive circuit according to an embodiment of the present disclosure.

FIG. 14 is another schematic timing diagram of a pixel drive circuit according to an embodiment of the present disclosure. Referring to FIG. 14, V120>V130. The frequency of the valid frame in the first-frequency drive mode is higher than the frequency of the valid frame in the second-frequency drive mode. The ratio of the invalid frame in the second-frequency drive mode is greater than the ratio of the invalid frame in the first-frequency drive mode. The invalid frame drives the light-emitting element 20 to emit light by using a data signal written at the valid frame. The data signal is not written at the invalid frame. Generally speaking, the leakage degree in the second-frequency drive mode is heavier than the leakage degree in the first-frequency drive mode. Therefore, it is needed to pull down the first reset voltage VREF1 in the second-frequency drive mode and set the first reset voltage VREF1 for the invalid frame in the first-frequency drive mode to be higher than the first reset voltage VREF1 for the invalid frame in the second-frequency drive mode.

In an example, referring to FIG. 14, in the first-frequency drive mode, the first reset voltage VREF1 for the first invalid frame is the same as the first reset voltage VREF1 for the second invalid frame. In the second-frequency drive mode, the first reset voltage VREF1 for the first invalid frame, the first reset voltage VREF1 for the second invalid frame, and the first reset voltage VREF1 for the third invalid frame are all the same. The first reset voltage VREF1 for the first invalid frame in the first-frequency drive mode is higher than the first reset voltage VREF1 for the first invalid frame in the second-frequency drive mode.

In other embodiments, in each invalid frame in the first-frequency drive mode, at least two invalid frames have different first reset voltages VREF1. In each invalid frame in the second-frequency drive mode, at least two invalid frames have different first reset voltages VREF1.

Figure 15:
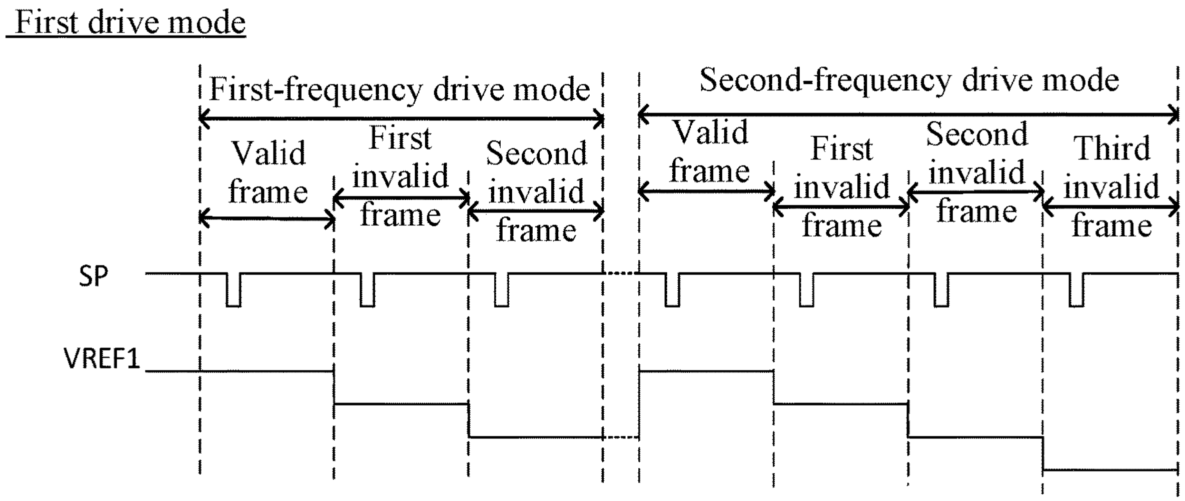
FIG. 15 is another schematic timing diagram of a pixel drive circuit according to an embodiment of the present disclosure.

FIG. 15 is another schematic timing diagram of a pixel drive circuit according to an embodiment of the present disclosure. Referring to FIG. 15, the first drive mode includes a first-frequency drive mode and a second-frequency drive mode. The frequency of the valid frame in the first-frequency drive mode is higher than the frequency of the valid frame in the second-frequency drive mode. The display frame in the first-frequency drive mode includes at least one invalid frame. The at least one invalid frame includes a first invalid frame. In the first-frequency drive mode, a first reset voltage VREF1 for the first invalid frame is lower than a first reset voltage VREF1 for the valid frame. The display frame in the second-frequency drive mode includes at least two invalid frames. The at least two invalid frames include a first invalid frame and a second invalid frame. In a drive sequence, the first invalid frame is located between the valid frame and the second invalid frame. In the second-frequency drive mode, a first reset voltage VREF1 for the first invalid frame is lower than a first reset voltage VREF1 for the valid frame, and a first reset voltage VREF1 for the second invalid frame is lower than the first reset voltage VREF1 for the valid frame. The first reset voltage VREF1 for the first invalid frame in the first-frequency drive mode is equal to the first reset voltage VREF1 for the first invalid frame in the second-frequency drive mode.

In an example, referring to FIG. 15, the first reset voltage VREF1 for the valid frame in the first-frequency drive mode is the same as the first reset voltage VREF1 for the valid frame in the second-frequency drive mode. The first reset voltage VREF1 for the first invalid frame in the first-frequency drive mode is the same as the first reset voltage VREF1 for the first invalid frame in the second-frequency drive mode. The voltage drop from the valid frame in the first-frequency drive mode to the first invalid frame in the first-frequency drive mode is the same as the voltage drop from the valid frame in the second-frequency drive mode to the first invalid frame in the second-frequency drive mode, reducing the design requirements of the drive circuit in the display panel.

In an example, referring to FIG. 15, the display frame in the first-frequency drive mode includes a first invalid frame and a second invalid frame. The display frame in the second-frequency drive mode includes a first invalid frame, a second invalid frame and a third invalid frame. The first reset voltage VREF1 for the first invalid frame in the first-frequency drive mode is equal to the first reset voltage VREF1 for the first invalid frame in the second-frequency drive mode. The first reset voltage VREF1 for the second invalid frame in the first-frequency drive mode is equal to the first reset voltage VREF1 for the second invalid frame in the second-frequency drive mode.

Figure 16:
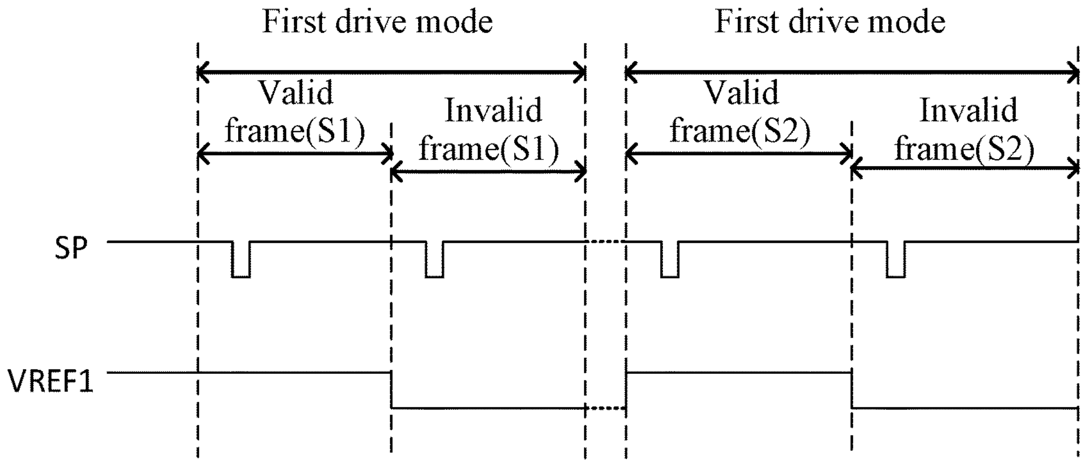
FIG. 16 is another schematic timing diagram of a pixel drive circuit according to an embodiment of the present disclosure.

FIG. 16 is another schematic timing diagram of a pixel drive circuit according to an embodiment of the present disclosure. Referring to FIG. 16, the display frame includes a first fundamental-frequency display frame and a second fundamental-frequency display frame. The frame driving duration of the first fundamental-frequency display frame is S1. The frame driving duration of the second fundamental-frequency display frame is S2. S1<S2. The first reset voltage VREF1 for the invalid frame in the first drive mode using the first fundamental-frequency display frame is higher than the first reset voltage VREF1 for the invalid frame in the first drive mode using the second fundamental-frequency display frame, reducing the design requirements of the drive circuit in the display panel.

In an example, referring to FIG. 16, the first reset voltage VREF1 for the valid frame in the first drive mode using the first fundamental-frequency display frame is the same as the first reset voltage VREF1 for the valid frame in the first drive mode using the second fundamental-frequency display frame, reducing the design requirements of the drive circuit in the display panel.

Figure 17:
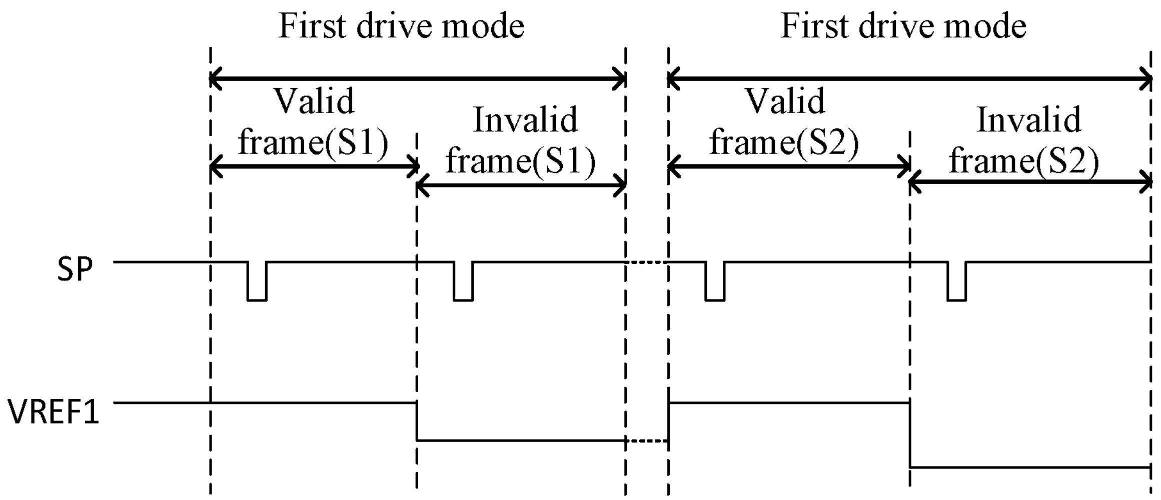
FIG. 17 is another schematic timing diagram of a pixel drive circuit according to an embodiment of the present disclosure.

FIG. 17 is another schematic timing diagram of a pixel drive circuit according to an embodiment of the present disclosure. Referring to FIG. 17, the display frame includes a first fundamental-frequency display frame and a second fundamental-frequency display frame. The frame driving duration of the first fundamental-frequency display frame is S1. The frame driving duration of the second fundamental-frequency display frame is S2. S1<S2. The first reset voltage VREF1 for the invalid frame in the first drive mode using the first fundamental-frequency display frame is higher than the first reset voltage VREF1 for the invalid frame in the first drive mode using the second fundamental-frequency display frame. The frame driving duration of the first fundamental-frequency display frame is lower than the frame driving duration of the second fundamental-frequency display frame. The frequency of the valid frame in the first drive mode using the first fundamental-frequency display frame is higher than the frequency of the valid frame in the first drive mode using the second fundamental-frequency display frame. Generally speaking, the leakage degree in the first drive mode using the second fundamental-frequency display frame is heavier than the leakage degree in the first drive mode using the first fundamental-frequency display frame. Therefore, it is needed to pull down the first reset voltage VREF1 in the first drive mode using the second fundamental-frequency display frame and set the first reset voltage VREF1 for the invalid frame in the first drive mode using the first fundamental-frequency display frame to be higher than the first reset voltage VREF1 for the invalid frame in the first drive mode using the second fundamental-frequency display frame.

Figure 18:
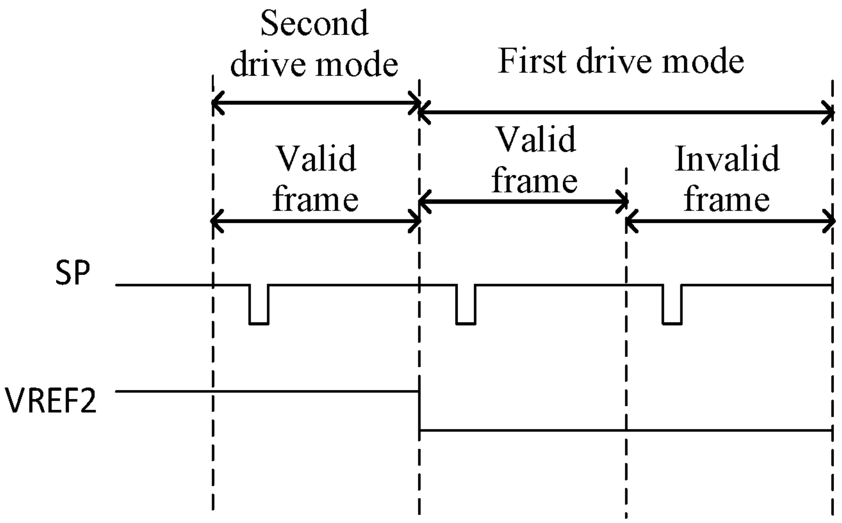
FIG. 18 is another schematic timing diagram of a pixel drive circuit according to an embodiment of the present disclosure.

FIG. 18 is another schematic timing diagram of a pixel drive circuit according to an embodiment of the present disclosure. Referring to FIGS. 2 and 18, the pixel drive circuit 10 also includes a second reset module 12. The second reset module 12 is connected to a second node N2 and configured to provide a second reset voltage VREF2 to the second node N2, to reset the second node N2. A gate of the drive transistor T1 is connected to the second node N2. The second node N2 may be a physical connection point or a virtual connection point. The working mode of the display panel also includes a second drive mode. A display frame in the second drive mode includes a valid frame. The valid frame in the second drive mode has a higher frequency than the valid frame in the first drive mode. The drive frequency in the second drive mode is a fundamental frequency. The drive frequency in the first drive mode is a frequency downconverted from the fundamental frequency. The second reset voltage VREF2 for the valid frame in the first drive mode is lower than the second reset voltage VREF2 for the valid frame in the second drive mode. In the embodiments of the present disclosure, the first drive mode includes an invalid frame and the second drive mode does not include an invalid frame.

As time passed by, the problem caused by the leakage current becomes more and more prominent. For the same grayscale level, the brightness-level of the light-emitting element in the first drive mode is lower than the brightness-level of the light-emitting element in the second drive mode so that the brightness-level of the light-emitting element in the first drive mode needs to be compensated to alleviate the flicker problem of the display panel when the frequency is switched.

In one embodiment, a lower second reset voltage VREF2 can be provided in the first drive mode, to pull down the voltage value of the second reset voltage VREF2 in the first drive mode, reduce the voltage value of the gate (connected to the second node N2) of the drive transistor T1, improve the charging speed of writing a data signal to the gate of the drive transistor T1, and increase the light-emitting brightness-level of the light-emitting element 20. In this manner, the display brightness-level of the display panel at the lower refresh rate is compensated, and the difference between the display brightness-level at the higher refresh rate and the display brightness-level at the lower refresh rate is reduced.

In other embodiments, the second reset voltage VREF2 for the valid frame in the first drive mode is equal to the second reset voltage VREF2 for the valid frame in the second drive mode. The brightness-level compensation of the light-emitting element (at the lower refresh rate) in the first drive mode may be implemented in other ways.

Since the degree of the leakage current of the transistor is different at different grayscale levels, the degree of the leakage current of the transistor at the high grayscale level is, for example, heavier than the degree of the leakage current of the transistor at the low grayscale level. In the case where the brightness-level compensation is not implemented in the first drive mode, the brightness-level of the light-emitting element driven based on the data signal at the low grayscale level is relatively small, and the brightness-level of the light-emitting element driven based on the data signal at the high gray scale is relatively large. The flicker problem caused by the high grayscale level is more prone to deteriorate the display effect. With respect to the brightness-level difference problem at the low grayscale level when the frequency is switched, when the brightness-level of the light-emitting element is compensated in the first drive mode, more attention is paid to improving the high grayscale level. If the compensation standard is to satisfy the brightness-level compensation at the high grayscale level, the brightness-level at the low grayscale level tends to be overcompensated. A first reset voltage VREF1 for the valid frame is different from a first reset voltage VREF1 for the invalid frame in the first drive mode, the brightness-level at the low grayscale level in the first drive mode is "finely adjusted" so that the performance of the light-emitting element at both the high grayscale level and the low grayscale level can satisfy the display requirements, alleviating the flicker problem of the light-emitting element at both the high grayscale level and the low grayscale level when the frequency is switched.

Figure 19:
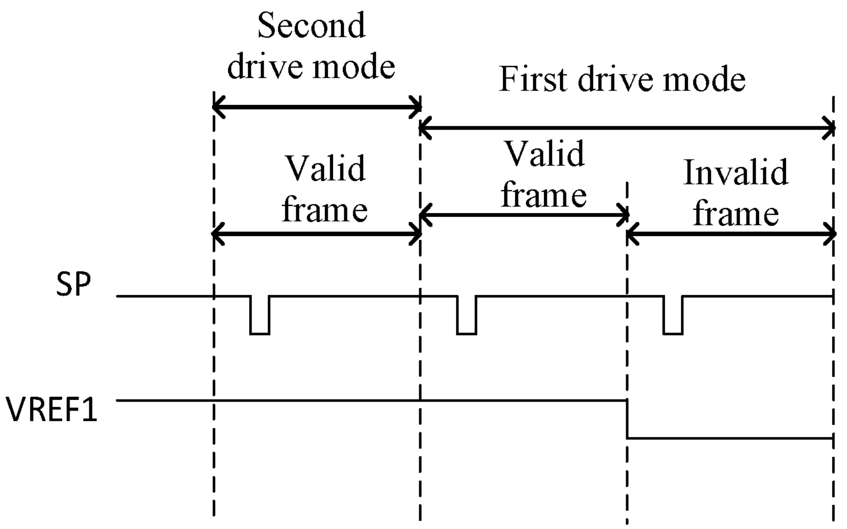
FIG. 19 is another schematic timing diagram of a pixel drive circuit according to an embodiment of the present disclosure.

FIG. 19 is another schematic timing diagram of a pixel drive circuit according to an embodiment of the present disclosure. Referring to FIGS. 2 and 19, the pixel drive circuit 10 also includes a second reset module 12. The second reset module 12 is connected to a second node N2 and configured to provide a second reset voltage VREF2 to the second node N2, to reset the second node N2. A gate of the drive transistor T1 is connected to the second node N2. The working mode of the display panel also includes a second drive mode. A display frame in the second drive mode includes a valid frame. The valid frame in the second drive mode has a higher frequency than the valid frame in the first drive mode. A first reset voltage VREF1 for the valid frame in the first drive mode is the same as a first reset voltage VREF1 for the valid frame of the second drive mode. After the second drive mode reduces the drive frequency to be switched to the first drive mode, the voltage value of the first reset voltage VREF1 does not need to be changed at the valid frame in the first drive mode, reducing the design requirements of the drive circuit in the display panel.

In an example, referring to FIG. 2, a control terminal of the second reset module 12 is electrically connected to a first scan signal control terminal sn1. A first terminal of the second reset module 12 is connected to the second node N2. The gate of the drive transistor T1 is connected to the second node N2. A second terminal of the second reset module 12 is electrically connected to a second reset voltage terminal vref2. When a first scan signal SN1 transmitted by the first scan signal control terminal sn1 controls the second reset module 12 to be turned on, a second reset voltage VREF2 for the second reset voltage terminal vref2 is transmitted to the second node N2.

Figure 20:
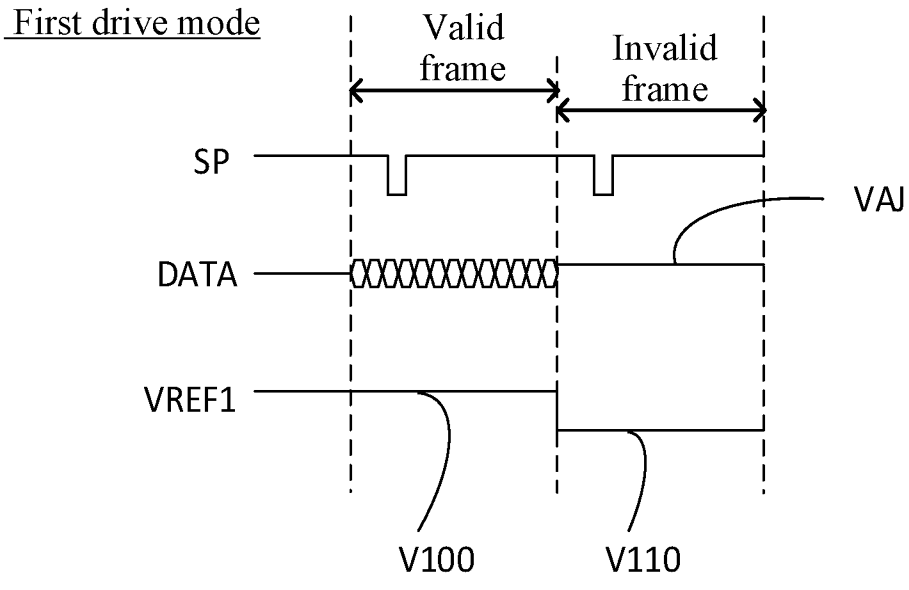
FIG. 20 is another schematic timing diagram of a pixel drive circuit according to an embodiment of the present disclosure.

FIG. 20 is another schematic timing diagram of a pixel drive circuit according to an embodiment of the present disclosure. Referring to FIGS. 2 and 20, the pixel drive circuit 10 also includes a data write transistor T3. The data write transistor T3 is connected to a third node N3. A first electrode of the drive transistor T1 is connected to the third node N3. The third node N3 may be a physical connection point or a virtual connection point. At the valid frame, the data write transistor T3 provides a data signal DATA to the third node N3, and the drive transistor T1 is conductive, and writes the data voltage corresponding to data signal DATA to the first node N1. At the invalid frame, the data write transistor T3 provides an adjusting voltage VAJ to the third node N3. In the embodiments of the present disclosure, the data write transistor T3 provides the adjusting voltage VAJ to the third node N3 at the invalid frame, reducing the difference between the bias state of the drive transistor T1 at the invalid frame and the bias state of the drive transistor T1 at the valid frame, reducing the display brightness-level at the lower refresh rate, reducing the difference between the display brightness-level of the display panel at the lower refresh rate and the display brightness-level at the higher refresh rate, and improving the display effect of the display panel.

In an example, the voltage for the data signal DATA is the data voltage that is preset in the display panel to display different grayscale levels. The lower the display grayscale level, the greater the voltage for the corresponding data signal DATA. The higher the display grayscale level, the lower the voltage for the corresponding data signal DATA. The voltage for the data signal DATA is a positive voltage.

Figure 21:
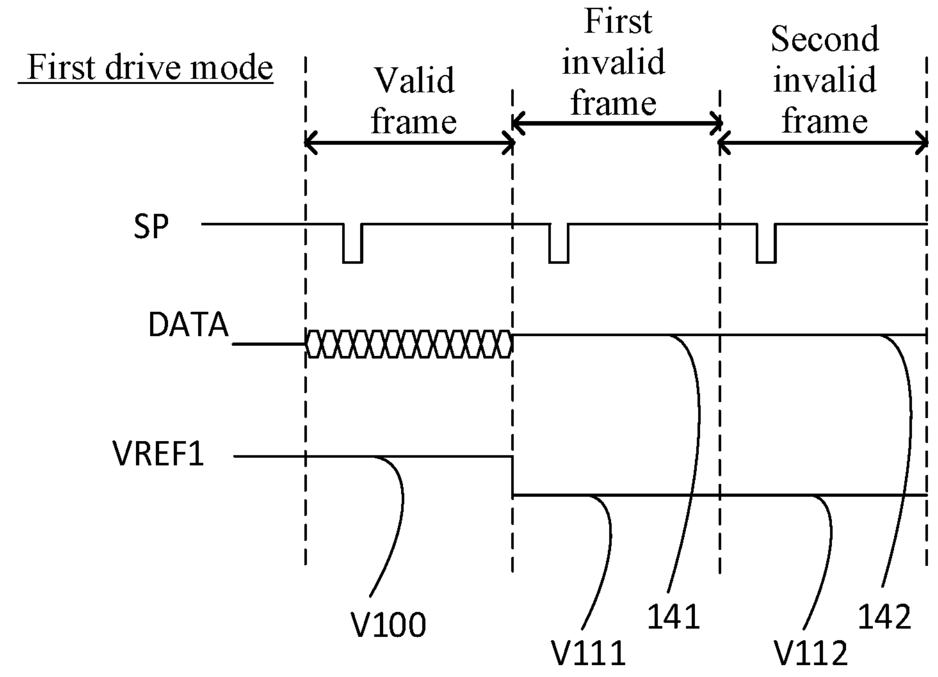
FIG. 21 is another schematic timing diagram of a pixel drive circuit according to an embodiment of the present disclosure.

FIG. 21 is another schematic timing diagram of a pixel drive circuit according to an embodiment of the present disclosure. Referring to FIG. 21, the display frame in the first drive mode includes at least two invalid frames. Adjusting voltages VAJ of the at least two invalid frames are the same. Two invalid frames having the same adjusting voltages VAJ are provided with the same voltage, reducing the design requirements of the drive circuit in the display panel.

In an example, referring to FIG. 21, the at least two invalid frames include a first invalid frame and a second invalid frame. In a drive sequence, the first invalid frame is located between the valid frame and the second invalid frame. The adjusting voltage VAJ of the first invalid frame is denoted as V141. The adjusting voltage VAJ of the second invalid frame is denoted as V142. V141=V142.

In some embodiments, in the first drive mode, the adjusting voltage VAJ of each invalid frame between adjacent two frame valid frames is the same, reducing the design requirements of the drive circuit in the display panel.

Figure 22:
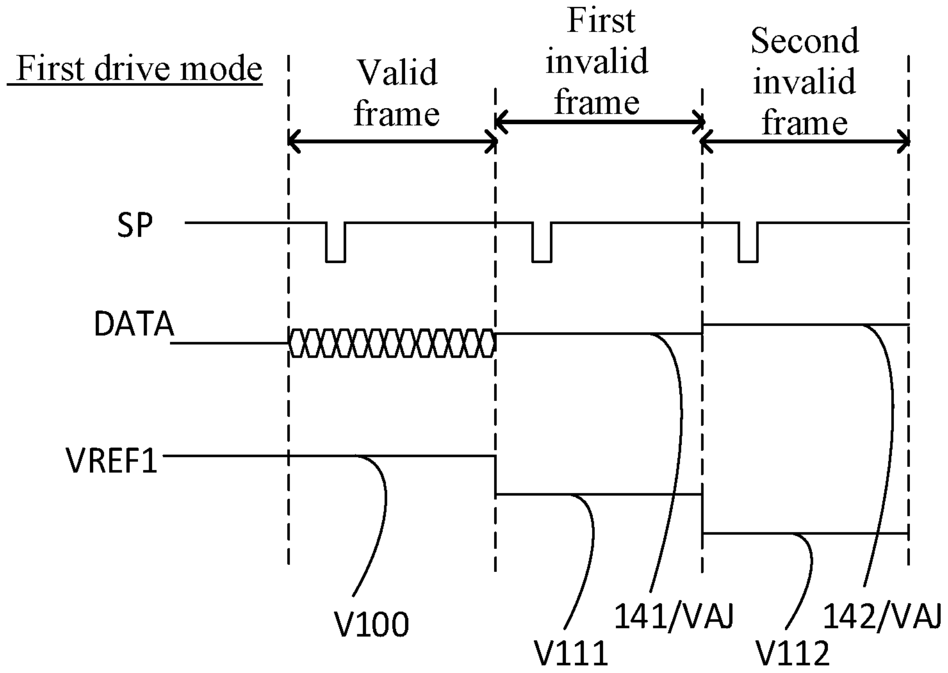
FIG. 22 is another schematic timing diagram of a pixel drive circuit according to an embodiment of the present disclosure.

FIG. 22 is another schematic timing diagram of a pixel drive circuit according to an embodiment of the present disclosure. Referring to FIG. 22, the display frame in the first drive mode includes at least two invalid frames. The at least two invalid frames include a first invalid frame and a second invalid frame. In a drive sequence, the first invalid frame is located between the valid frame and the second invalid frame. The adjusting voltage VAJ of the first invalid frame is denoted as V141. The adjusting voltage VAJ of the second invalid frame is denoted as V142. V141<V142. The invalid frame drives the light-emitting element 20 to emit light by using a data signal written at the valid frame. The data signal is not written at the invalid frame. The first invalid frame is the first display frame after the valid frame. The second invalid frame is the second display frame after the valid frame. The time duration of the second invalid frame from the valid frame is longer than the time duration of the first invalid frame from the valid frame. The leakage degree of the second invalid frame is heavier than the leakage degree of the first invalid frame. Therefore, it is needed to pull up the adjusting voltage VAJ of the second invalid frame and set the adjusting voltage VAJ of the first invalid frame to be lower than the adjusting voltage VAJ of the second invalid frame.

In some embodiments, in the first drive mode, adjusting voltages VAJ for any two invalid frames between adjacent two valid frames are different.

In some embodiments, referring to FIG. 22, a value of the adjusting voltage VAJ is greater than or equal to the minimum value of the data signal DATA. The adjusting voltage VAJ is provided to the third node N3 at the invalid frame, reducing the difference between the bias state of the drive transistor T1 at the invalid frame and the bias state of the drive transistor T1 at the valid frame, and reducing the display brightness-level at the lower refresh rate.

In an example, a value of the adjusting voltage VAJ is greater than or equal to the minimum value of the data signal DATA and smaller than or equal to the maximum value of the data signal DATA.

In another example, a value of the adjusting voltage VAJ is greater than or equal to the maximum value of the data signal DATA.

In an example, the adjusting voltage VAJ may be provided as a constant voltage. The adjusting voltage VAJ is provided as the constant voltage so that when the display panel works at the invalid frame, the drive circuit provides the constant voltage to a data voltage terminal data, simplifying the working mode of the drive circuit.

Figure 23:
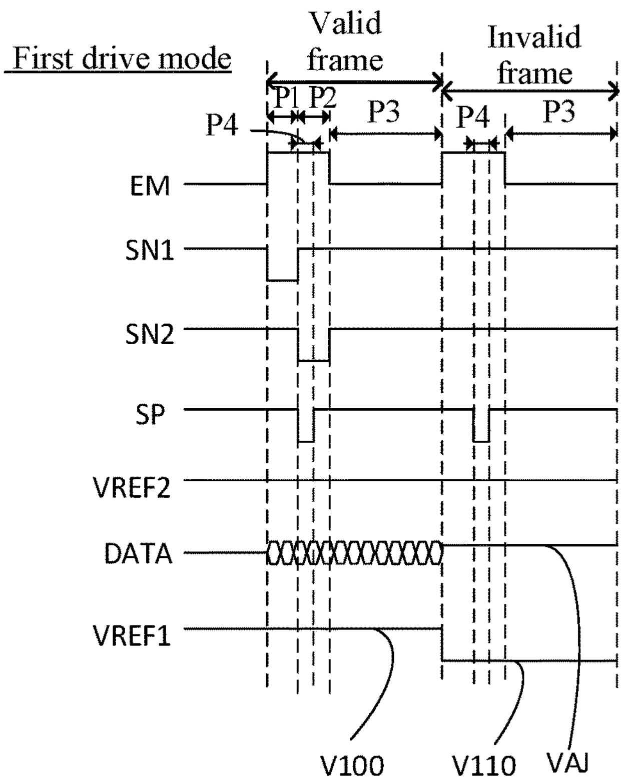
FIG. 23 is another schematic timing diagram of a pixel drive circuit according to an embodiment of the present disclosure.

FIG. 23 is another schematic timing diagram of a pixel drive circuit according to an embodiment of the present disclosure. Referring to FIGS. 2 and 23, the pixel drive circuit 10 also includes a compensation transistor T4 configured to compensate a threshold voltage for the drive transistor T1. At the valid frame, the compensation transistor T4 is conductive. When the compensation transistor T4 is conductive, a gate of the drive transistor T1 is electrically connected to a second electrode of the drive transistor T1. At the invalid frame, the compensation transistor T4 is cut off.

In some embodiments, referring to FIG. 2, the first reset module 11 includes a first reset transistor T7. A gate of the first reset transistor T7 is electrically connected to a strobe scan signal control terminal sp. A first electrode of the first reset transistor T7 is connected to the first node N1. A second electrode of the first reset transistor T7 is electrically connected to a first reset voltage terminal vref1. The display panel also includes a second reset module 12, a data write transistor T3, a compensation transistor T4, a power write transistor T5, and a light-emitting control transistor T6. The second reset module 12 includes a second reset transistor T2. A gate of the second reset transistor T2 is electrically connected to a first scan signal control terminal sn1. A first electrode of the second reset transistor T2 is connected to a second node N2. The gate of the drive transistor T1 is connected to the second node N2. A second electrode of the second reset transistor T2 is electrically connected to a second reset voltage terminal vref2. A gate of the data write transistor T3 is electrically connected to the strobe scan signal control terminal sp. A first electrode of the data write transistor T3 is connected to a third node N3. A first electrode of the drive transistor T1 is connected to the third node N3. A second electrode of the data write transistor T3 is electrically connected to a data voltage terminal data. A gate of the power write transistor T5 is electrically connected to a light-emitting signal control terminal em. A first electrode of the power write transistor T5 is connected to the third node N3. A second electrode of the power write transistor T5 is electrically connected to a first power terminal pvdd. When a light-emitting signal EM transmitted by the light-emitting signal control terminal em controls the power write transistor T5 to be conductive, a first power voltage for the first power terminal pvdd is transmitted to the third node N3. A gate of the light-emitting control transistor T6 is electrically connected to the light-emitting signal control terminal em. A first electrode of the light-emitting control transistor T6 is electrically connected to a second electrode of the drive transistor T1. A second electrode of the light-emitting control transistor T6 is electrically connected to the first node N1. Agate of the compensation transistor T4 is electrically connected to a second scan signal control terminal sn2. A first electrode of the compensation transistor T4 is connected to the second node N2. A second electrode of the compensation transistor T4 is electrically connected to the second electrode of the drive transistor T1. When a second scan signal SN2 transmitted by the second scan signal control terminal sn2 controls the compensation transistor T4 to be conductive, the gate of the drive transistor T1 is connected to the second electrode of the drive transistor T1.

In an example, referring to FIG. 2, the pixel drive circuit 10 also includes a storage capacitor cst. A first plate of the storage capacitor cst is electrically connected to the first power terminal pvdd. A second plate of the storage capacitor cst is connected to the second node N2 and configured to maintain the voltage for the second node N2.

In an example, referring to FIGS. 2 and 23, the case where the transistor in the pixel drive circuit 10 is a P-type transistor is taken as an example. The working process of the display panel includes a valid frame and an invalid frame.

At the valid frame, the pixel drive circuit works in a first period P1, a second period P2 and a third period P3. The first period P1 is located before the second period P2. The second period P2 is located before the third period P3. The second period P2 includes a fourth period P4. In the first period P1, the light-emitting signal EM is at a high level, a first scan signal SN1 is at a low level, the second scan signal SN2 is at a high level, a strobe scan signal SP is at a high level, the power write transistor T5 and the light-emitting control transistor T6 are turned off, and the second reset transistor T2 is conductive, to transmit a second reset voltage VREF2 for the second reset voltage terminal vref2 to the second node N2, and reset the gate of the drive transistor T1. In this manner, it can be ensured that when the display panel executes the valid frame, an accurate data voltage can be written into the gate of the drive transistor T1, the compensation transistor T4 is turned off, and the data write transistor T3 and the first reset transistor T7 are turned off. In the second period P2, the light-emitting signal EM is at a high level, the first scan signal SN1 is at a high level, the second scan signal SN2 is at low level, the power write transistor T5 and the light-emitting control transistor T6 are turned off, the second reset transistor T2 is turned off, and the compensation transistor T4 is conductive, to connect the gate of the drive transistor T1 to the second electrode of the drive transistor T1. In the fourth period P4 in the second period P2, the strobe scan signal SP is at a low level, the data write transistor T3 is conductive, to transmit a data signal DATA to the third node N3, the drive transistor T1 and the compensation transistor T4 are conductive, to transmit the data signal DATA of the third node N3 to the second node N2 through the driving transistor T1 and the compensation transistor T4, and write the data voltage to the second node N2, and the first reset transistor T7 is conductive, to transmit a first reset voltage VREF1 for the first reset voltage terminal vref1 to the first node N1, and reset the anode of the light-emitting element 20. The first reset voltage VREF1 is a first voltage V100. In the third period P3, the light-emitting signal EM is at a low level, the first scan signal SN1 is at a high level, the second scan signal SN2 is at a high level, the strobe scan signal SP is at a high level, the power write transistor T5 and the light-emitting control transistor T6 are conductive, to provide a drive current generated by the drive transistor T1 to the light-emitting element 20 to control the light-emitting brightness-level of the light-emitting element 20, the second reset transistor T2 is turned off, the compensation transistor T4 is turned off, and the data write transistor T3 and the first reset transistor T7 are turned off.

At the invalid frame, the pixel drive circuit executes the fourth period P4 and the third period P3. The third period P3 is after the fourth period P4. In the fourth period P4, the light-emitting signal EM is at a high level, the first scan signal SN1 is at a high level, the second scan signal SN2 is at a low level, the strobe scan signal SP is at a low level, the power write transistor T5 and the light-emitting control transistor T6 are turned off, the second reset transistor T2 is turned off, the compensation transistor T4 is conductive, to connect the gate of the drive transistor T1 to the second electrode of the drive transistor T1, the data write transistor T3 is conductive, to transmit the adjusting voltage VAJ to the third node N3, reducing the difference between the bias state of the drive transistor T1 at the invalid frame and the bias state of the drive transistor T1 at the valid frame, and the first reset transistor T7 is conductive, to transmit the first reset voltage VREF1 for the first reset voltage terminal vref1 to the first node N1, and reset the anode of the light-emitting element 20. The first reset voltage is a second voltage V110. The second voltage V110 is lower than the first voltage V100. In this manner, the display brightness-level at the lower refresh rate and at the low grayscale level is pulled low, and the difference between the display brightness-level at the higher refresh rate and at the low grayscale level and the display brightness-level at the lower refresh rate and at the low grayscale level is reduced. The working process of the pixel drive circuit in the third period P3 at the invalid frame is the same as that in the third period P3 at the valid frame, and will not be repeated herein.

In an example, referring to FIG. 23, each display frame includes one third period P3. That is, each display frame includes one light-emitting stage. In other embodiments, each display frame may also include multiple third periods P3.

Figure 24:
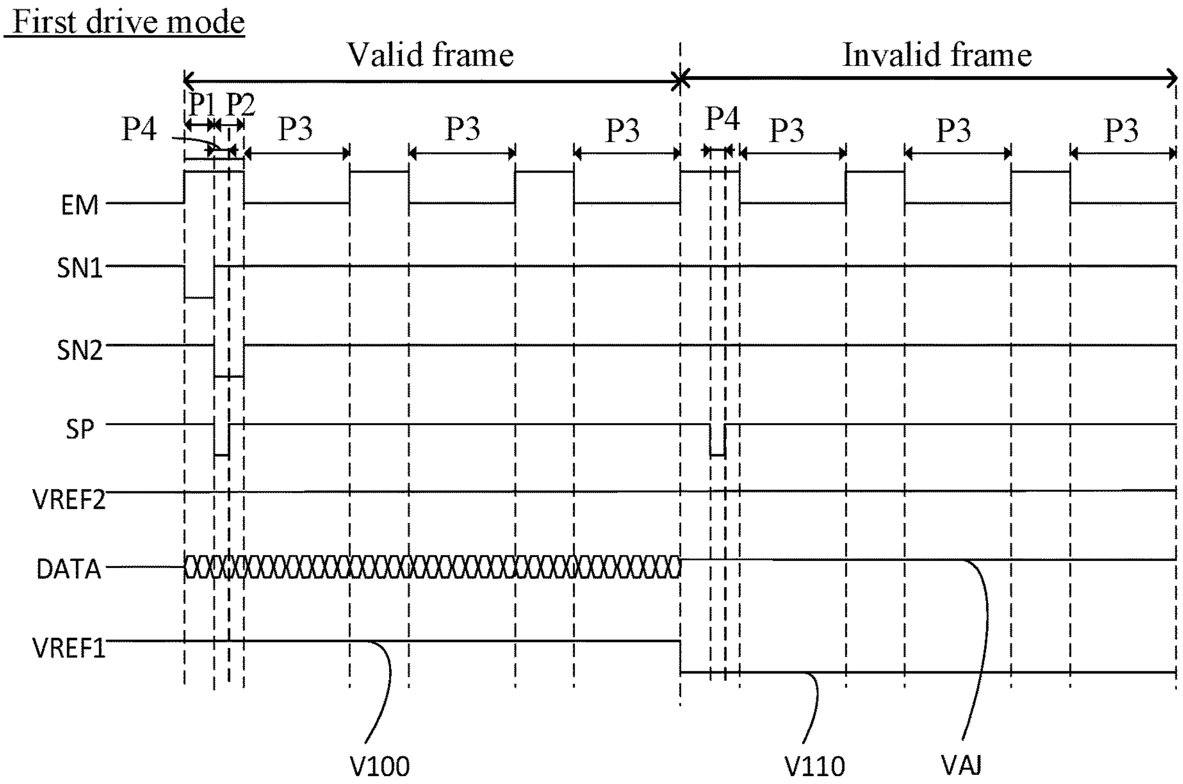
FIG. 24 is another schematic timing diagram of a pixel drive circuit according to an embodiment of the present disclosure.

FIG. 24 is another schematic timing diagram of a pixel drive circuit according to an embodiment of the present disclosure. Referring to FIG. 24, the display panel has lower display brightness-level at the low grayscale level that is also referred to as a dark state display. To improve the display uniformity, multiple third periods P3 may be provided in each display frame.

In an example, referring to FIG. 24, the valid frame includes a first period P1, a second period P2 and three third periods P3. The second period P2 is located after the first period P1. Each of the three third periods P3 is located after the second period P2. The second period P2 includes a fourth period P4. The invalid frame includes a fourth period P4 and three third periods P3. Each of the three third periods P3 is located after the fourth period P4.

Figure 25:
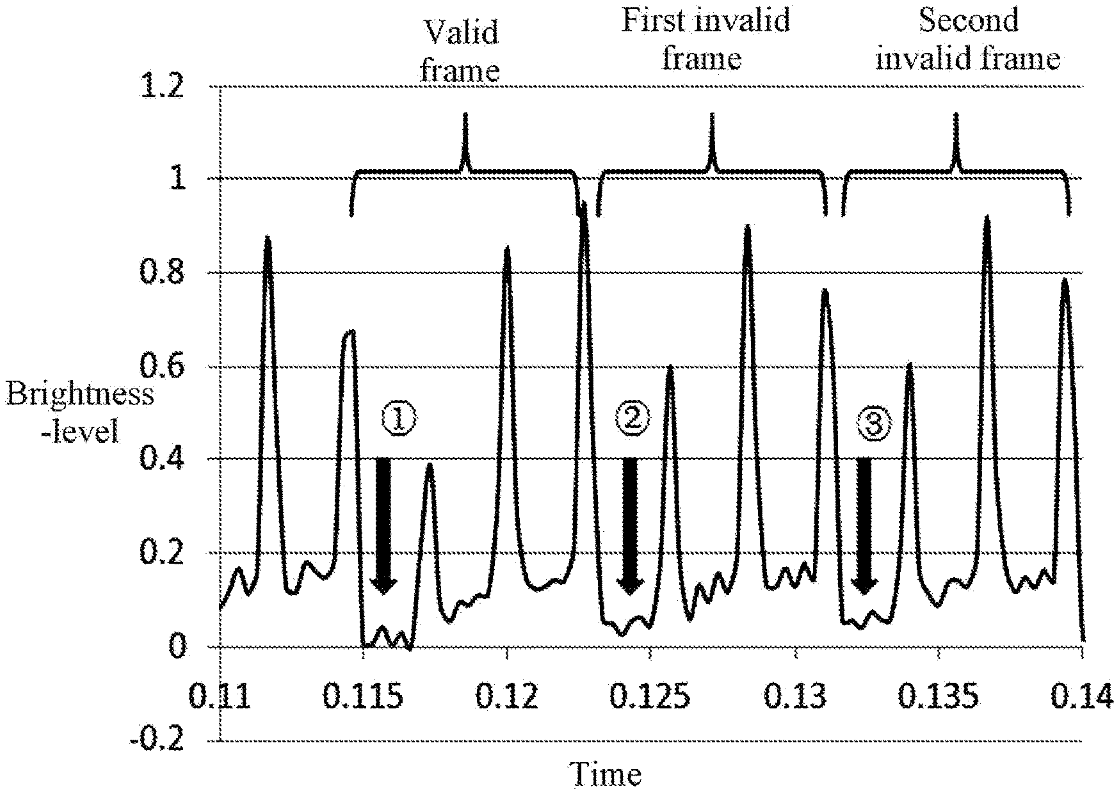
FIG. 25 is a timing-brightness-level waveform diagram in the related art.

FIG. 25 is a timing-brightness-level waveform diagram in the related art. Referring to FIGS. 24 and 25, brightness-level in the ordinate is a relative brightness-level value. Each frame (including the valid frame and the invalid frame, where the invalid frame includes a first invalid frame and a second invalid frame) has three third periods P3, forming three brightness-level peaks. In FIG. 25, at the valid frame, the position pointed by ① indicates a first brightness-level valley value of the effective frame of the valid frame. At the first invalid frame, the position pointed by ② indicates a first brightness-level valley value of the first invalid frame. At the second invalid frame, the position pointed by ③ indicates a first brightness-level valley value of the second invalid frame. The first brightness-level valley value of the first invalid frame is greater than the first brightness-level valley value of the valid frame. The first brightness-level valley value of the second invalid frame is greater than the first brightness-level valley value of the valid frame. The first brightness-level valley value of the invalid frame is significantly elevated with respect to the brightness-level valley value of the valid frame, causing the display brightness-level at the higher refresh rate and at the low grayscale level to be lower than the display brightness-level at the lower refresh rate and at the low grayscale level.

Figure 26:
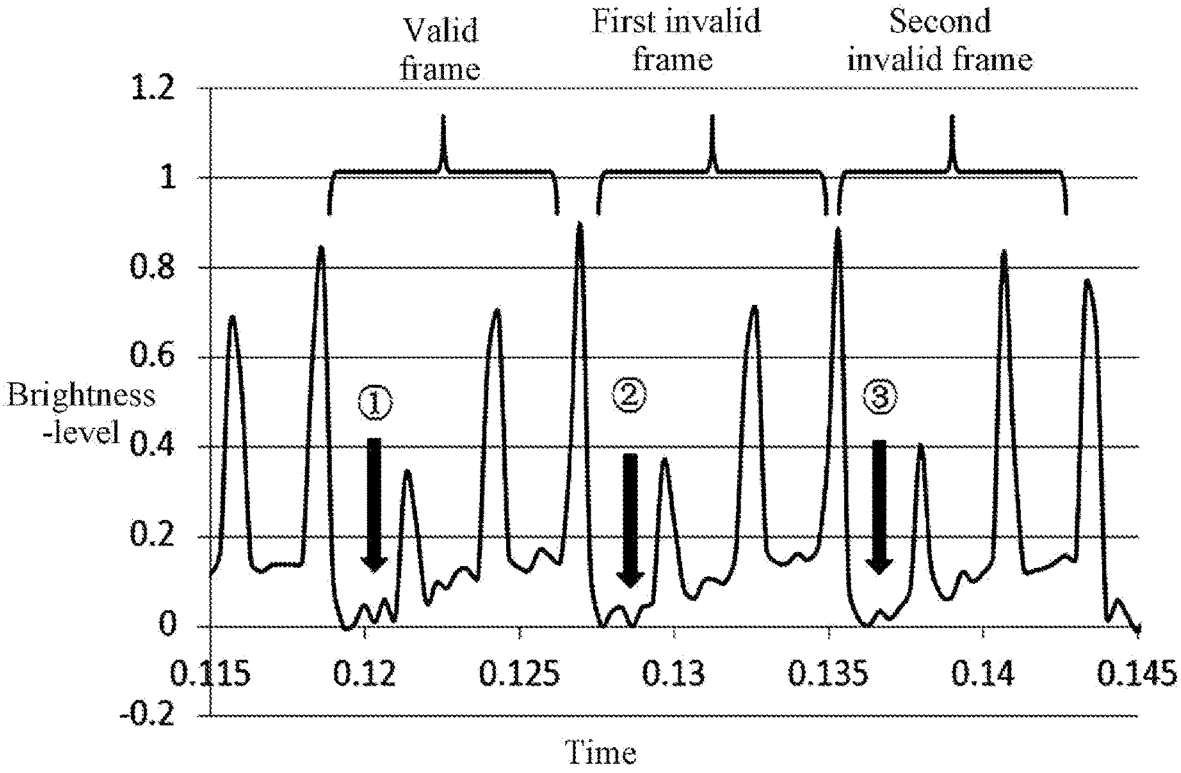
FIG. 26 is a timing-brightness-level waveform diagram with compensation according to an embodiment of the present disclosure.

FIG. 26 is a timing-brightness-level waveform diagram with compensation according to an embodiment of the present disclosure. Referring to FIG. 26, the first reset voltage VREF1 for the valid frame is different from the first reset voltage VREF1 for the invalid frame, in FIG. 26, the first brightness-level valley value of the first invalid frame is substantially equal to the first brightness-level valley value of the valid frame, and the first brightness-level valley value of the second invalid frame is substantially equal to the first brightness-level valley value of the valid frame. In this manner, the difference between the display brightness-level at the lower refresh rate and at the low grayscale level and the display brightness-level at the higher refresh rate and at the low grayscale level is reduced, the difference between the display brightness-level at the lower refresh rate and the display brightness-level at the higher refresh rate is reduced of the display panel, and the display effect of the display panel is improved.

In an example, referring to FIG. 2, the drive transistor T1 is a P-type transistor.

In other embodiments, the drive transistor T1 may also be an N-type transistor. Correspondingly, a voltage variation direction of the first reset voltage VREF1 is opposite to a voltage variation direction of the first reset voltage VREF1 when the drive transistor T1 is the P-type transistor. A voltage variation direction of the adjusting voltage VAJ is opposite to a voltage variation direction of the adjusting voltage VAJ when the drive transistor T1 is the P-type transistor. A voltage variation direction of the second reset voltage VREF2 is opposite to a voltage variation direction of the second reset voltage VREF2 when the drive transistor T1 is the P-type transistor.

It should be noted that, in some of the timing diagrams, to highlight the variation pattern of the signal, the schematic of other signals in the pixel drive circuit is omitted. Reference can be made to the detailed schematics of FIGS. 3, 23 and 24.

Figure 27:
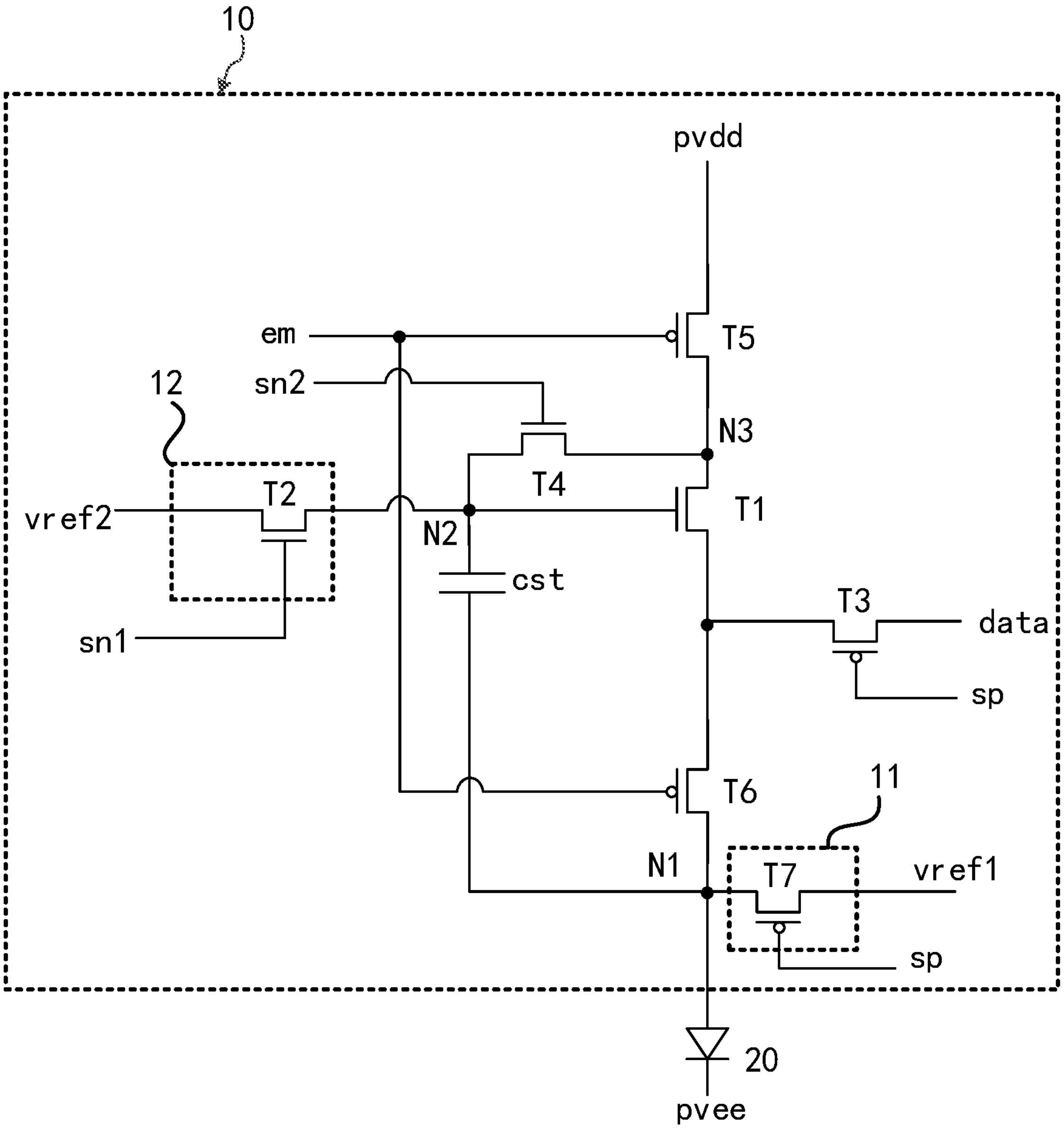
FIG. 27 is another schematic circuit diagram of a pixel drive circuit according to an embodiment of the present disclosure.
Figure 28:
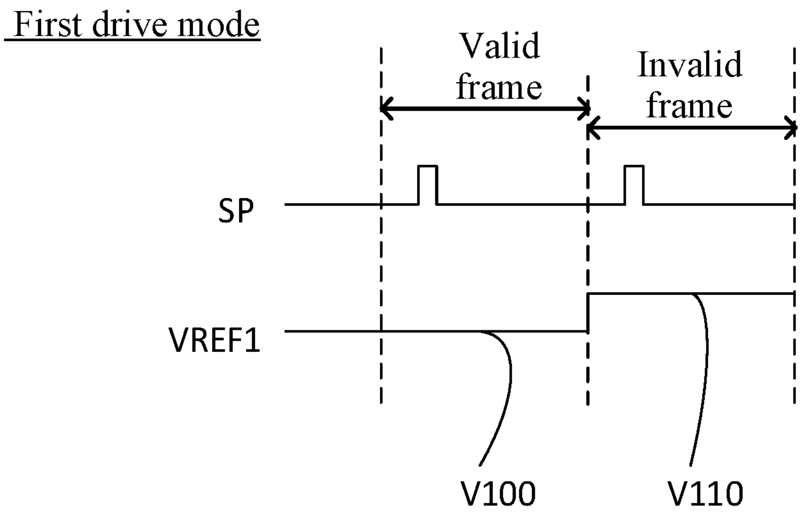
FIG. 28 is another schematic timing diagram of a pixel drive circuit according to an embodiment of the present disclosure.

FIG. 27 is another schematic circuit diagram of a pixel drive circuit according to an embodiment of the present disclosure. FIG. 28 is another schematic timing diagram of a pixel drive circuit according to an embodiment of the present disclosure. Referring to FIGS. 27 and 28, the drive transistor T1 is an N-type transistor. The first reset voltage VREF1 for the invalid frame is higher than the first reset voltage VREF1 for the valid frame. In the embodiments of the present disclosure, the display brightness-level of the light-emitting element at the lower refresh rate and at the low grayscale level is pulled low by a secondary compensation, reducing the difference between the display brightness-level at the higher refresh rate and at the low grayscale level and the display brightness-level at the lower refresh rate and at the low grayscale level. Dark state brightness-level is the display brightness-level of the display panel at the low grayscale level.

Figure 29:
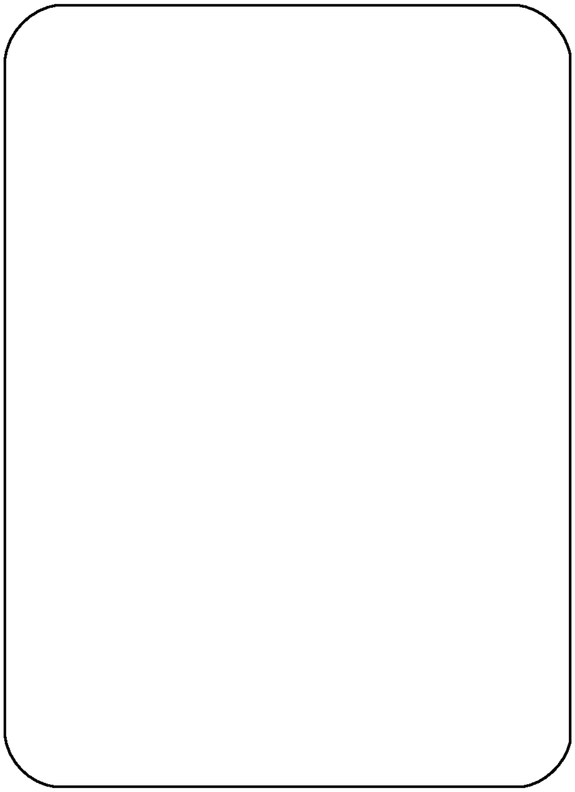
FIG. 29 is a schematic diagram of a display device according to an embodiment of the present disclosure.

An embodiment of the present disclosure further provides a display device. FIG. 29 is a schematic diagram of a display device according to an embodiment of the present disclosure. Referring to FIG. 29, the display device includes any display panel provided by the embodiment of the present disclosure. The display device may specifically be a mobile phone, a tablet computer, a smart wearable apparatus and so on.

What is claimed is:

1. A display panel, comprising:

a light-emitting element; and a pixel drive circuit electrically connected to the light-emitting element, wherein the pixel drive circuit comprises a drive transistor and a first reset module, the first reset module is connected to a first node and configured to provide a first reset voltage to the first node, and the light-emitting element is connected to the first node, and wherein the first reset module comprises a first reset transistor, a gate of the first reset transistor is electrically connected to a strobe scan signal control terminal, a first electrode of the first reset transistor is connected to the first node, and a second electrode of the first reset transistor is electrically connected to a first reset voltage terminal;

wherein a working mode of the display panel comprises a first drive mode, a display frame in the first drive mode comprises a valid frame and an invalid frame, and in the first drive mode, a first reset voltage for the valid frame is different from a first reset voltage for the invalid frame; and wherein the display panel further comprises:

a second reset module, wherein the second reset module comprises: a second reset transistor, a gate of the second reset transistor is electrically connected to a first scan signal control terminal, a first electrode of the second reset transistor is connected to a second node, a gate of the drive transistor is connected to the second node, and a second electrode of the second reset transistor is electrically connected to a second reset voltage terminal;

a data write transistor, wherein a gate of the data write transistor is electrically connected to the strobe scan signal control terminal, a first electrode of the data write transistor is connected to a third node, a first electrode of the drive transistor is connected to the third nod, and a second electrode of the data write transistor is electrically connected to a data voltage terminal;

a power write transistor, wherein a gate of the power write transistor is electrically connected to a light-emitting signal control terminal, a first electrode of the power write transistor is connected to the third node, and a second electrode of the power write transistor is electrically connected to a first power terminal;

a light-emitting control transistor, wherein a gate of the light-emitting control transistor is electrically connected to the light-emitting signal control terminal, a first electrode of the light-emitting control transistor is electrically connected to a second electrode of the drive transistor, and a second electrode of the light-emitting control transistor is electrically connected to the first node; and a compensation transistor, wherein a gate of the compensation transistor is electrically connected to a second scan signal control terminal, a first electrode of the compensation transistor is connected to the second node, and a second electrode of the compensation transistor is electrically connected to the second electrode of the drive transistor.

2. The display panel of claim 1, wherein the first reset voltage for the invalid frame is lower than the first reset voltage for the valid frame.

3. The display panel of claim 1, wherein the first reset voltage for the valid frame comprises a first voltage, the first reset voltage for the invalid frame comprises a second voltage, and a difference between the second voltage and the first voltage is between 0.1 V and 1 V.

4. The display panel of claim 1, wherein the display frame in the first drive mode comprises a plurality of invalid frames, and at least two of the plurality of invalid frames have a same first reset voltage.

5. The display panel of claim 1, wherein the display frame in the first drive mode comprises a plurality of invalid frames, and at least two of the plurality of invalid frames have different first reset voltages.

6. The display panel of claim 5, wherein the at least two invalid frames comprise a first invalid frame and a second invalid frame, in a drive sequence, the first invalid frame is located between the valid frame and the second invalid frame, a first reset voltage for the first invalid frame is lower than the first reset voltage for the valid frame, and a first reset voltage for the second invalid frame is lower than the first reset voltage for the first invalid frame.

7. The display panel of claim 6, wherein a difference between the first reset voltage for the first invalid frame and the first reset voltage for the valid frame is a first difference; a difference between the first reset voltage for the second invalid frame and the first reset voltage for the first invalid frame is a second difference; and the first difference is equal to the second difference, or the first difference is greater than the second difference.

8. The display panel of claim 1, wherein the first drive mode comprises a first-frequency drive mode and a second-frequency drive mode, a valid frame in the first-frequency drive mode has a higher frequency than a valid frame in the second-frequency drive mode; and wherein an invalid frame in the first-frequency drive mode has a same first reset voltage as an invalid frame in the second-frequency drive mode, or a first reset voltage for an invalid frame in the first-frequency drive mode is higher than a first reset voltage for an invalid frame in the second-frequency drive mode.

9. The display panel of claim 1, wherein the first drive mode comprises a first-frequency drive mode and a second-frequency drive mode, a valid frame in the first-frequency drive mode has a higher frequency than a valid frame in the second-frequency drive mode;

wherein a display frame in the first-frequency drive mode comprises at least one invalid frame, the at least one invalid frame in the first-frequency drive mode comprises a first invalid frame, and in the first-frequency drive mode, a first reset voltage for the first invalid frame is lower than the first reset voltage for the valid frame;

wherein a display frame in the second-frequency drive mode comprises a plurality of invalid frames, the plurality of invalid frames comprise a first invalid frame and a second invalid frame, the first invalid frame is located between the valid frame and the second invalid frame in a drive sequence, and in the second-frequency drive mode, a first reset voltage for the first invalid frame is lower than the first reset voltage for the valid frame, and a first reset voltage for the second invalid frame is lower than the first reset voltage for the valid frame; and wherein the first reset voltage for the first invalid frame in the first-frequency drive mode is equal to the first reset voltage for the first invalid frame in the second-frequency drive mode.

10. The display panel of claim 1, wherein the display frame comprises a first fundamental-frequency display frame and a second fundamental-frequency display frame, the first fundamental-frequency display frame has a shorter frame driving duration than the second fundamental-frequency display frame; and the first reset voltage for the invalid frame in the first drive mode using the first fundamental-frequency display frame is same as the first reset voltage for the invalid frame in the first drive mode using the second fundamental-frequency display frame.

11. The display panel of claim 1, wherein the display frame comprises a first fundamental-frequency display frame and a second fundamental-frequency display frame, and the first fundamental-frequency display frame has a shorter frame driving duration than the second fundamental-frequency display frame; and the first reset voltage for the invalid frame in the first drive mode using the first fundamental-frequency display frame is higher than the first reset voltage for the invalid frame in the first drive mode using the second fundamental-frequency display frame.

12. A display panel, comprising:

a light-emitting element; and a pixel drive circuit electrically connected to the light-emitting element, wherein the pixel drive circuit comprises a drive transistor and a first reset module, the first reset module is connected to a first node and configured to provide a first reset voltage to the first node, and the light-emitting element is connected to the first node;

wherein a working mode of the display panel comprises a first drive mode, a display frame in the first drive mode comprises a valid frame and an invalid frame, and in the first drive mode, a first reset voltage for the valid frame is different from a first reset voltage for the invalid frame;

wherein the pixel drive circuit further comprises a second reset module, wherein the second reset module is connected to a second node and configured to provide a second reset voltage to the second node, and a gate of the drive transistor is connected to the second node; and wherein the working mode of the display panel further comprises a second drive mode, wherein a display frame in the second drive mode comprises a valid frame, the valid frame in the second drive mode has a higher frequency than the valid frame in the first drive mode, and a second reset voltage for the valid frame in the first drive mode is lower than a second reset voltage for the valid frame in the second drive mode.

13. The display panel of claim 1, wherein the pixel drive circuit further comprises a second reset module, wherein the second reset module is connected to a second node and configured to provide a second reset voltage to the second node, and a gate of the drive transistor is connected to the second node; and wherein the working mode of the display panel further comprises a second drive mode, wherein a display frame in the second drive mode comprises a valid frame, the valid frame in the second drive mode has a higher frequency than the valid frame in the first drive mode, and the first reset voltage for the valid frame in the first drive mode is same as a first reset voltage for the valid frame in the second drive mode.

14. The display panel of claim 1, wherein the pixel drive circuit further comprises a data write transistor, wherein the data write transistor is connected to a third node, and a first electrode of the drive transistor is connected to the third node;

at the valid frame, the data write transistor provides a data signal to the third node; and at the invalid frame, the data write transistor provides an adjusting voltage to the third node.

15. The display panel of claim 14, wherein the display frame in the first drive mode comprises a plurality of invalid frames, and at least two of the plurality of invalid frames have a same adjusting voltage.

16. A display panel, comprising:

a light-emitting element; and a pixel drive circuit electrically connected to the light-emitting element, wherein the pixel drive circuit comprises a drive transistor and a first reset module, the first reset module is connected to a first node and configured to provide a first reset voltage to the first node, and the light-emitting element is connected to the first node;

wherein a working mode of the display panel comprises a first drive mode, a display frame in the first drive mode comprises a valid frame and an invalid frame, and in the first drive mode, a first reset voltage for the valid frame is different from a first reset voltage for the invalid frame;

wherein the pixel drive circuit further comprises a data write transistor, wherein the data write transistor is connected to a third node, and a first electrode of the drive transistor is connected to the third node;

at the valid frame, the data write transistor provides a data signal to the third node; and at the invalid frame, the data write transistor provides an adjusting voltage to the third node; and wherein the display frame in the first drive mode comprises a plurality of invalid frames, and the plurality of invalid frames comprise a first invalid frame and a second invalid frame, and wherein in a drive sequence, the first invalid frame is located between the valid frame and the second invalid frame, and the first invalid frame has a lower adjusting voltage than the second invalid frame.

17. The display panel of claim 14, wherein a value of the adjusting voltage is greater than or equal to a minimum value of the data signal.

18. The display panel of claim 1, wherein the pixel drive circuit further comprises a compensation transistor configured to compensate a threshold voltage for the drive transistor; and at the valid frame, the compensation transistor is conductive, and at the invalid frame, the compensation transistor is cut off.

19. A display device, comprising: the display panel of claim 1.

* * * * *